United States Patent
Lim et al.

(10) Patent No.: US 12,164,937 B2
(45) Date of Patent: Dec. 10, 2024

(54) SYSTEMS AND METHODS FOR ENCODING AND RENDERING GENERIC VISUALIZATIONS OF A GUI OF A CLIENT APPLICATION

(71) Applicant: Bitdrift, Inc., San Francisco, CA (US)

(72) Inventors: Brendan Gonzales Lim, San Jose, CA (US); Taggart C. Matthiesen, Kentfield, CA (US); Vicky Li, San Francisco, CA (US); Martin Conte MacDonell, San Jose, CA (US); Matthew David Klein, Boise, ID (US)

(73) Assignee: Bitdrift, Inc., San Francisco, CA (US)

( * ) Notice: Subject to any disclaimer, the term of this patent is extended or adjusted under 35 U.S.C. 154(b) by 0 days.

(21) Appl. No.: 17/977,925

(22) Filed: Oct. 31, 2022

(65) Prior Publication Data
US 2024/0143347 A1     May 2, 2024

(51) Int. Cl.
*G06F 9/451*     (2018.01)
*H04L 41/22*     (2022.01)

(52) U.S. Cl.
CPC .............. *G06F 9/451* (2018.02); *H04L 41/22* (2013.01)

(58) Field of Classification Search
CPC .......... G06F 8/38; G06F 40/103; G06F 3/048; G06F 40/197; G06F 9/451; G06F 3/0482;
(Continued)

(56) References Cited

U.S. PATENT DOCUMENTS

| 5,475,843 | A  | 12/1995 | Halviatti et al. |
| 8,296,665 | B2 | 10/2012 | Stienhans et al. |

(Continued)

FOREIGN PATENT DOCUMENTS

| AU | 2008236660 A1 | * | 11/2009 | .............. G01S 1/68 |
| CA | 2304619 A1 | * | 4/1999 | |

(Continued)

OTHER PUBLICATIONS

International Searching Authority. International Search Report and Written Opinion issued in International Application No. PCT/US2023/036507, mailed on Feb. 23, 2024, 6 pages.
(Continued)

*Primary Examiner* — Steven P Sax
(74) *Attorney, Agent, or Firm* — Lee Sullivan Shea & Smith LLP

(57) ABSTRACT

A client device installed with a client application having a graphical user interface (GUI) may be configured to (i) at a given time during a runtime session of the client application, identify a set of GUI elements within the GUI of the client application that is to be represented in a generic visualization of the GUI, (ii) generate a dataset that encodes the generic visualization of the GUI, wherein the generated dataset comprises a respective data structure for each GUI element in the identified set that encodes information for rendering a generic representation of the GUI element, and (iii) after generating the dataset that encodes the generic visualization of the GUI, transmit the generated dataset that encodes the generic visualization of the GUI to a back-end platform associated with a provider of the client application.

20 Claims, 13 Drawing Sheets

(58) Field of Classification Search
CPC .... G06F 40/146; G06F 40/166; G06F 3/0484; G06F 40/143; G06F 2203/04803; G06Q 10/067; G06T 11/00; G06T 19/006; G06T 7/73; G06T 11/60; G06T 2210/12; H04L 41/22

See application file for complete search history.

(56) References Cited

U.S. PATENT DOCUMENTS

| | | | | |
|---|---|---|---|---|
| 8,587,517 | B2* | 11/2013 | Perkunder | G06F 3/0362 345/184 |
| 9,772,929 | B2 | 9/2017 | Yates | |
| 2003/0151621 | A1 | 8/2003 | McEvilly et al. | |
| 2004/0113930 | A1* | 6/2004 | Hawley | G06F 9/451 715/700 |
| 2013/0097615 | A1* | 4/2013 | Falco | G06F 9/546 719/313 |
| 2014/0068470 | A1 | 3/2014 | DiVita et al. | |
| 2014/0215344 | A1* | 7/2014 | Ligman | G06F 11/3466 715/736 |
| 2014/0269929 | A1* | 9/2014 | Kasai | H04N 19/91 375/240.23 |
| 2016/0020782 | A1* | 1/2016 | Ruff | H03M 7/6011 341/95 |
| 2023/0114043 | A1* | 4/2023 | Wan | G06F 3/013 345/633 |
| 2023/0186534 | A1* | 6/2023 | Doken | G06V 10/761 345/633 |

FOREIGN PATENT DOCUMENTS

| | | | | |
|---|---|---|---|---|
| CA | 2004532470 | A | * 10/2008 | |
| CA | 2723674 | A1 | * 11/2009 | ......... H04L 12/5695 |
| CA | 2505580 | C | * 8/2011 | ............ G06F 17/211 |
| CA | 2539134 | C | * 11/2011 | ............... G06F 8/10 |
| CA | 2539047 | C | * 1/2012 | ............... G06F 8/35 |
| CA | 2539130 | C | * 9/2012 | ............... G06F 8/20 |
| CA | 2604449 | C | * 10/2012 | ............... G06F 8/38 |
| CA | 2538861 | C | * 11/2012 | ............... G06F 8/30 |
| CA | 2902868 | A1 | * 9/2014 | ............. G06F 16/22 |
| CA | 3027762 | A1 | * 6/2019 | ............. G06T 11/00 |
| CA | 2852059 | C | * 3/2021 | ............... G06F 3/08 |
| CA | 2935469 | C | * 5/2022 | ............... G01L 15/00 |
| CA | 2902869 | C | * 11/2022 | ............. G06F 3/0608 |
| CN | 100558166 | C | * 11/2009 | |
| CN | 101788797 | A | * 7/2010 | |
| JP | 2004272928 | A | * 9/2004 | ............... G06T 1/60 |
| JP | 2014526071 | A | * 10/2014 | |
| TW | I437486 | B | * 5/2014 | |
| TW | 202109428 | A | * 3/2021 | ............. G06F 12/04 |

OTHER PUBLICATIONS

Webb, Christopher. Finding the First Common Superview in Swift. Journey of One Thousand Apps [online], [retrieved Sep. 28, 2022], Retrieved from the Internet: <https://medium.com/journey-of-one-thousand-apps/fi nding-the-fi rst-common-superview-in-swift-4abac8a87d84>, 8 pages.

Zhou, Sophie. From Code to Screen: How our Code Gets Turned into Pixels on the Screen. Nextdoor Engineering [online], [retrieved Sep. 21, 2022], Retrieved from the Internet: <https://engblog.nextdoor.com/from-code-to-screen-how-our-code-gets-turned-into-pixels-on-the-screen-877d874d87f5>, 6 pages.

Graphical User Interface. Wikipedia [online], [retrieved Sep. 21, 2022], Retrieved from the Internet: <https://en.wikipedia.org/wiki/Graphical_user_interface>, 8 pages.

Model-View-Controller. Wikipedia [online], [retrieved Sep. 21, 2022], Retrieved from the Internet: <https://en.wikipedia.org/wiki/Model-view-controller>, 3 pages.

Performance and View Hierarchies. Android Developers [online], [retrieved Sep. 22, 2022], Retrieved from the Internet: <https://developer.android.com/topic/performance/rendering/optimizing-view-hierarchies>, 6 pages.

Reading 8: Output [online], [retrieved Sep. 21, 2022], Retrieved from the Internet: <courses.csail.mit.edu/6.831/2015/handouts/08-output/reading/>, 21 pages.

UI Software Architecture [online], [retrieved Sep. 21, 2022], Retrieved from the Internet: <ccourses.csail.mit.edu/6.831/2014/readings/L06-ui-sw-arch/>, 19 pages.

UIView: Apple Developer Documentation. Apple Inc. [online], [retrieved Sep. 22, 2022], Retrieved from the Internet: <https://developer.apple.com/documentation/uikit/uiview>, 26 pages.

Understanding iPhone Views, Windows and the View Hierarchy. Techotopia [online], [retrieved Sep. 21, 2022], Retrieved from the Internet: <https://www.techotopia.com/index.php/Understanding_iPhone_Views,_Windows_and_the_View_Hierarchy>, 6 pages.

View Geometry. Apple Inc. [online], [retrieved Sep. 21, 2022], Retrieved from the Internet: <https://developer.apple.com/library/archive/documentation/Cocoa/Conceptual/CocoaViewsGuide/Coordinates/Coordinates.html#//apple_ref/doc/uid/TP40002978-CH . . . >, 4 pages.

What Are Views? Apple Inc. [online], [retrieved Sep. 21, 2022], Retrieved from the Internet: <https://developer.apple.com/library/archive/documentation/Cocoa/Conceptual/CocoaViewsGuide/WhatAreViews/WhatAreViews.html#//apple_ref/ doc/uid/TP400029 . . . >, 2 pages.

Working with the View Hierarchy. Apple Inc. [online], [retrieved Sep. 21, 2022], Retrieved from the Internet: <https://developer.apple.com/library/archive/documentation/Cocoa/Conceptual/CocoaViewsGuide/ WorkingWithAViewHierarchy/WorkingWithAViewHierarchy.html>, 7 pages.

* cited by examiner

| MAP ELEMENT 402 | CONTAINER ELEMENT 404 | IMAGE ELEMENT 406 | CONTAINER ELEMENT 408 | IMAGE ELEMENT 404A | TEXT ELEMENT 410 | CONTAINER ELEMENT 412 | IMAGE ELEMENT 414A | TEXT ELEMENT 414B | TEXT ELEMENT 414C | TOOLBAR ELEMENT 416 | POPUP ELEMENT 418 |

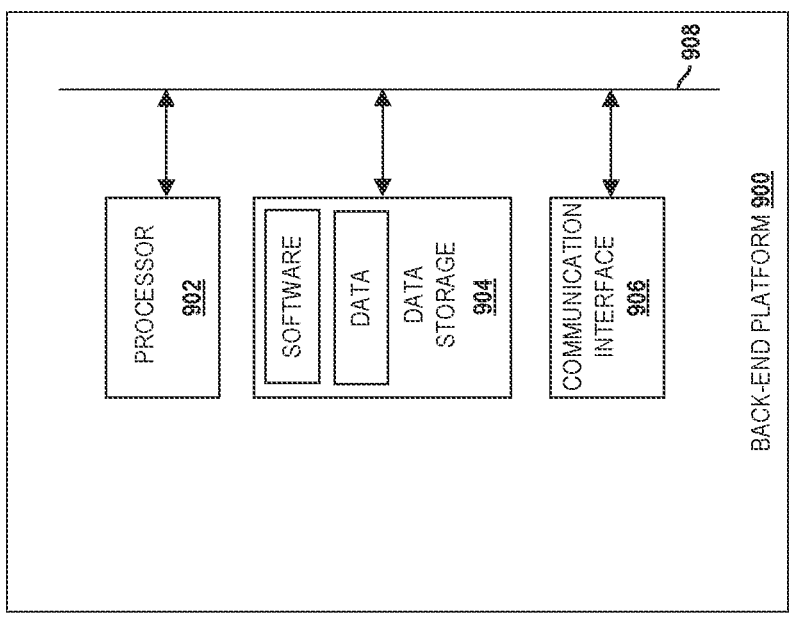

SYSTEMS AND METHODS FOR ENCODING AND RENDERING GENERIC VISUALIZATIONS OF A GUI OF A CLIENT APPLICATION

BACKGROUND

In today's digital age, client applications of all different kinds play an increasing role in peoples' daily lives. For example, users of mobile devices such as smartphones and tablets may use a wide range of different mobile applications (or "mobile apps" for short), examples of which may include lifestyle apps (e.g., ridesharing apps, travel apps, restaurant apps, dating apps, etc.), social media apps, entertainment apps (e.g., music apps, video apps, book apps, etc.), gaming apps, news apps, and/or productivity apps, among many other possible examples. As another example, users of other types of computers such as laptops and desktops may use a wide range of different desktop applications, which may fall into similar categories. As yet another example, users of mobile devices and computers may use a wide range of web applications that run within web browsers on the users' mobile devices and computers. The types of client applications that could be installed and used on mobile devices and/or other computers may take various other forms as well.

In order to release a new client application (or a new version of a client application) to users of mobile devices or other computers, a software provider typically has to engage in a multi-stage process that involves activities such as planning the client application, designing, developing, and building the client application, testing the client application, preparing the client application for release, and then releasing the client application, among other possible activities, which can be time consuming and costly. Moreover, after the software provider releases a client application and it starts to get installed and used by end users, issues with the client application often materialize that may give rise to a need for the software provider's personnel (e.g., developers, engineers, analysts, etc.) to review and evaluate the operation of the released client application in order to identify, diagnose, and try to resolve the issues. However, the technology that exists today for capturing and reporting information about runtime sessions of a client application has many limitations.

SUMMARY

In one aspect, the disclosed technology may take the form of a method implemented by a client device installed with a client application having a graphical user interface (GUI), where the method involves (i) at a given time during a runtime session of the client application, identifying a set of GUI elements within the GUI of the client application that may be represented in a generic visualization of the GUI, (ii) generating a dataset that encodes the generic visualization of the GUI, wherein the generated dataset includes a respective data structure for each GUI element in the identified set that encodes information for rendering a generic representation of the GUI element, and (iii) after generating the dataset that encodes the generic visualization of the GUI, transmitting the generated dataset that encodes the generic visualization of the GUI to a back-end platform associated with a provider of the client application.

The given time during the runtime session of the client application may take various forms, and in some example embodiments, the given time during the runtime session of the client application may include a time when a change to the GUI items within the GUI has been detected by the client application.

Further, the function of identifying the set of GUI elements within the GUI that is to be represented in the generic visualization of the GUI may take various forms, and in some example embodiments, may involve identifying the set of GUI elements within the GUI that is to be represented in the generic visualization of the GUI based on an inspection of a view hierarchy defining the GUI elements within the GUI. And in such example embodiments, the function of identifying the set of GUI elements within the GUI that is to be represented in the generic visualization of the GUI based on an inspection of a view hierarchy defining the GUI elements within the GUI may involve (i) inspecting a given level of the view hierarchy, (ii) based on inspecting the given level of the view hierarchy, identifying at least a first view to add to a set of candidate views that defines a set of a candidate GUI elements for the generic visualization of the GUI, wherein the first view defines a first GUI element within the GUI, (iii) evaluating whether the first GUI element defined by the first view fully obscures any GUI element defined by another view in the set of candidate views, and (iv) based on the evaluating, removing at least a second view from the set of candidate views.

Further yet, the respective data structure for each GUI element in the identified set may take various forms. For instance, in some example embodiments, the encoded information for rendering the generic representation of a GUI element that is within the respective data structure for the GUI element may comprise (i) type information for the GUI element, (ii) position information for the GUI element (e.g., a horizontal coordinate of the GUI element within the GUI and a vertical coordinate of the GUI element within the GUI), and (iii) size information for the GUI element (e.g., a width of the GUI element and a height of the GUI element). And in such example embodiments, the type, position, and size information for the GUI element could be encoded as a sequence of bytes, the respective data structure for the GUI element may further include an indication of how many bytes are utilized to encode the position and size information for the GUI element, such as an indication of how many bytes are respectively utilized to encode each of (i) the horizontal coordinate of the GUI element within the GUI, (ii) the vertical coordinate of the GUI element within the GUI, (iii) the width of the GUI element, and (iv) the height of the GUI element, and the type information for the GUI element and the indication of how many bytes are utilized to encode the position and size information for the GUI element could be encoded together as a single byte within the respective data structure, among other possibilities.

Still further, in some example embodiments, the function of generating the dataset that encodes the generic visualization of the GUI may further involve combining the respective data structures for the GUI elements in the identified set into a concatenated sequence having an order that corresponds to a rendering order of the GUI elements in the identified set.

In another aspect, the disclosed technology may take the form of a client device comprising at least one processor, at least one non-transitory computer-readable medium, and program instructions stored on the at least one non-transitory computer-readable medium that are executable by the at least one processor such that the client device is configured to carry out the functions of the aforementioned method.

In yet another aspect, the disclosed technology may take the form of a non-transitory computer-readable medium comprising program instructions stored thereon that are executable to cause a client device to carry out the functions of the aforementioned method.

It should be appreciated that many other features, applications, embodiments, and variations of the disclosed technology will be apparent from the accompanying drawings and from the following detailed description. Additional and alternative implementations of the structures, systems, non-transitory computer readable media, and methods described herein can be employed without departing from the principles of the disclosed technology.

BRIEF DESCRIPTION OF THE DRAWINGS

FIG. 5C is a diagram that illustrates one possible example of how the respective data structures for the identified GUI elements within the example GUI of FIG. 4A may be combined together to produce an example dataset that encodes the generic visualization of the example GUI;

FIG. 9 is a simplified block diagram that illustrates some structural components that may be included in an example back-end platform that may be configured to carry out any of the various functions disclosed herein.

DETAILED DESCRIPTION

Figure 1:
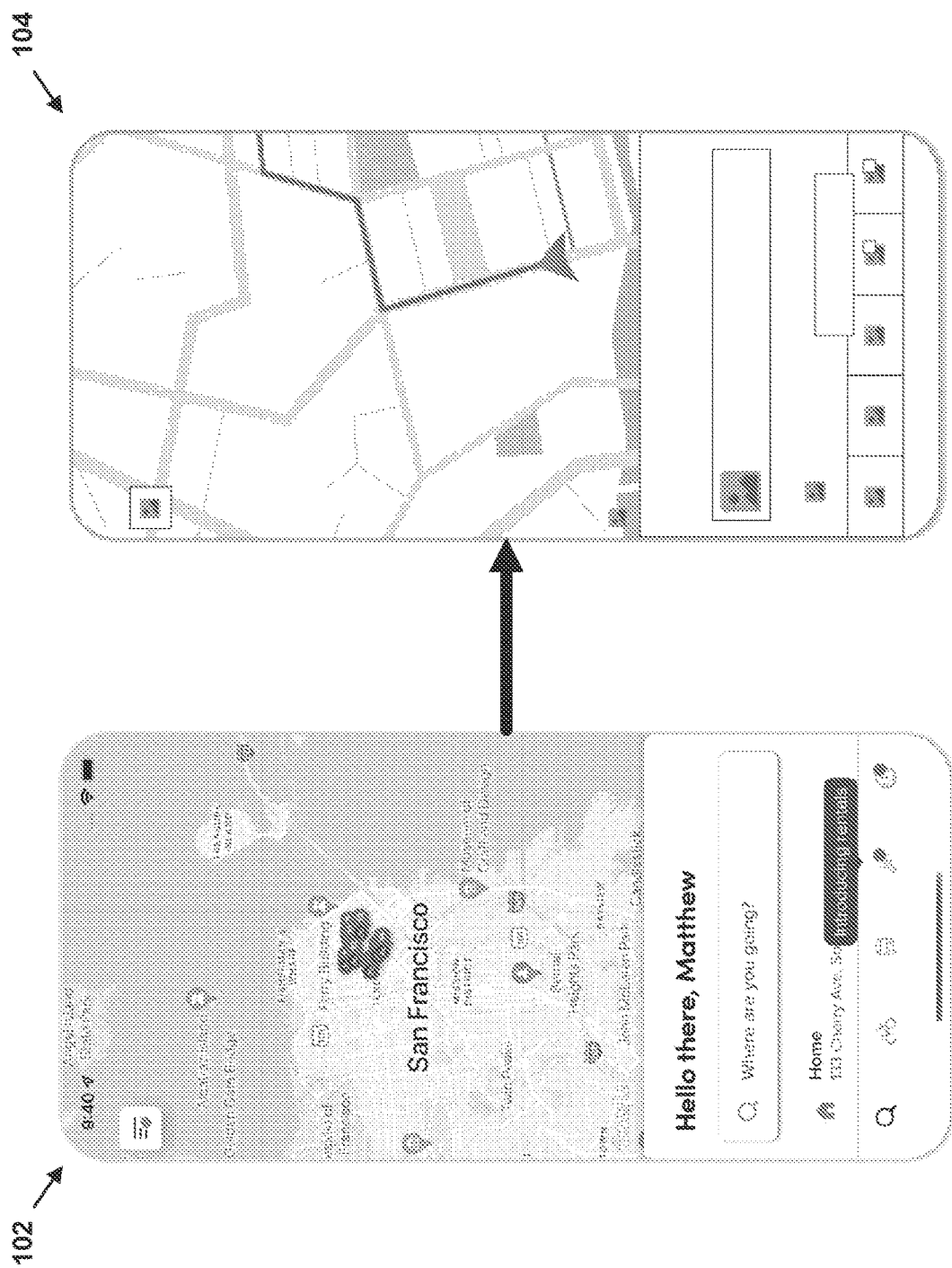
FIG. 1 shows one illustrative example of a generic visualization of a client application's graphical user interface (GUI) that may be encoded and reproduced in accordance with the disclosed technology.

As noted above, client applications of all different kinds play an increasing role in peoples' daily lives. For example, users of mobile devices such as smartphones and tablets may use a wide range of different mobile applications (or "mobile apps" for short), examples of which may include lifestyle apps (e.g., ridesharing apps, travel apps, restaurant apps, dating apps, etc.), social media apps, entertainment apps (e.g., music apps, video apps, book apps, etc.), gaming apps, news apps, and/or productivity apps, among many other possible examples. As another example, users of other types of computers such as laptops and desktops may use a wide range of different desktop applications, which may fall into similar categories. As yet another example, users of mobile devices and computers may use a wide range of web applications that run within web browsers on the users' mobile devices and computers. The types of client applications that could be installed and used on mobile devices and/or other computers may take various other forms as well.

In order to release a new client application (or a new version of a client application) to end users of mobile devices or other computers, a software provider typically has to engage in a multi-stage process that involves activities such as planning the client application, designing, developing, and building the client application, testing the client application, preparing the client application for release, and then releasing the client application, among other possible activities, which can be time consuming and costly. Moreover, after the software provider releases a client application and it starts to get installed and used by end users, issues with the client application often materialize that may give rise to a need for the software provider's personnel (e.g., developers, engineers, analysts, etc.) to review and evaluate the operation of the released client application in order to identify, diagnose, and try to resolve the issues.

To facilitate this evaluation by the software provider, a client application may be designed to capture certain information about runtime sessions of the client application, such as log information for the runtime sessions and perhaps also associated contextual information for the runtime sessions, and then periodically send the captured log information back to the software provider so that it can be reviewed and evaluated by the software provider's personnel. However, the technology that exists today for capturing and reporting information about runtime sessions of a client application has many limitations.

For instance, one such limitation is that client applications today may not report information for every runtime session of the client applications. Instead, the client applications today may only report information for runtime sessions during which certain types of serious events occurred, such as a crash, which means that the software provider's personnel may only be provided with visibility into a small percentage of the runtime sessions for the client application. As a result, the software provider may not have the visibility it needs in order to effectively identify, diagnose, and address performance issues with the client application after it has been released to end users.

Another such limitation is that the information about runtime sessions of a client application that is captured and reported today is limited in scope—typically, such information consists of certain levels of log entries (e.g., INFO, WARN, ERROR, and/or FATAL log levels) and perhaps certain types of associated contextual information, such as certain types of state information for the client device running the client application. However, this information about runtime sessions of a client application that is captured and reported today does not provide a software provider's personnel with the visibility they need in order to effectively identify, diagnose, and address issues with the client application after it has been released to end users. For instance, the information about runtime sessions of a client application that is captured and reported today typically does not provide a software provider's personnel with visibility as to the appearance of the client application's graphical user interface (GUI) being presented to an end user during a runtime session or the particular manner in which the end user interacted with the GUI elements within the client application's GUI. As a result, the software provider's personnel are forced to infer this information about the appearance and/or end-user interactions with the client application's GUI by reviewing the log entries that are captured and reported for the runtime session, which is difficult, time consuming, and prone to error.

One possible approach for addressing this deficiency with the existing technology for capturing and reporting information about runtime sessions of a client application would be to program a client application to capture and report either a screen recording of its GUI or periodic screenshots of its GUI during the course of a runtime session, which would then provide the software provider's personnel with visibility into the appearance of and/or end-user interaction with the client application's GUI when evaluating the runtime session of the client application. However, such an approach gives rise to several problems.

First, capturing and reporting the appearance and/or end-user interaction with a client application's GUI in the form of a screen recording or periodic screenshots may give rise to privacy concerns. For instance, this functionality could result in the capture and reporting of sensitive information about the end user (e.g., personally identifiable information, financial information, etc.) that is displayed within the client application's GUI and/or input by the end user into the GUI, which is not desirable for end users generally and in some cases could even lead to legal implications. In fact, these privacy concerns have led some operating system developers to prohibit client applications from capturing screen recordings or frequent screenshots during runtime sessions on end-user client devices.

Second, capturing and reporting the appearance and/or end-user interaction with a client application's GUI in the form of a screen recording or periodic screenshots may consume a significant amount of bandwidth due to the data size of screen recordings and screenshots, which could lead to a host of consequences that may negatively impact the end user—including degrading the performance of the client application (because the reporting of the screen recordings or screenshots may consume bandwidth that may otherwise be utilized by the client application for other end-user functionality), degrading the performance of the end user's home Wi-Fi network, and/or increasing the end user's cellular data usage to the point of potentially incurring overages, among other possibilities.

Thus, there remains a need for technology that provides a software provider's personnel with visibility into the appearance of and/or end-user interaction with a client application's GUI without giving rise to the same kinds of privacy and bandwidth concerns that are implicated by screen recordings or periodic screenshots of the client application's GUI.

To address these and other problems, disclosed herein is new software technology that enables a generic visualization of a client application's GUI to be encoded by the client application and then reproduced by a back-end platform associated with a software provider. In accordance with the present disclosure, a client application installed on an end-user's client device may be configured such that, at each of various different times during a runtime session (e.g., at times when the appearance of the client application's GUI changes and/or at regular intervals), the client application functions to encode a generic visualization of the given client application's GUI as it exists at that time by (i) identifying a set of GUI elements to be represented in the generic visualization of the GUI as it exists at that time and (ii) generating a dataset that encodes the generic visualization of the GUI as it exists at that time, where that dataset may comprise a respective data structure for each GUI element in the identified set that encodes information for rendering a generic visual representation of the GUI element in the identified set (e.g., type information, position information, size information, etc.). Thereafter, the client application may report the generated dataset that encodes the generic visualization of the GUI as it existed at that time to a back-end platform associated with the software provider— perhaps along with other information about the runtime session such as log information—and the back-end platform can then utilize that dataset to reproduce the generic visualization of the GUI as it existed at that time and cause it to be presented to individuals that are evaluating the runtime session of the client application.

FIG. 1 shows one illustrative example of a generic visualization of a client application's GUI that may be encoded and reproduced in accordance with the disclosed technology. In the example of FIG. 1, the client application takes the form of a mobile rideshare app offered by Lyft, Inc., which is the applicant of the present application. However, it should be understood that this discussion of a mobile rideshare app is merely provided for purposes of illustration only, and that the disclosed technology can be utilized to encode and reproduce a generic visualization of a GUI for any of various types of mobile and desktop applications, including but not limited to other types of lifestyle apps (e.g., travel apps, restaurant apps, dating apps, etc.), social media apps, entertainment apps (e.g., music apps, video apps, book apps, etc.), gaming apps, news apps, and/or productivity apps, among many other possible examples.

In FIG. 1, an example screenshot 102 is shown on the left-hand side to illustrate an example state of the mobile rideshare app's GUI at a given time during the course of a runtime session of the mobile rideshare app, and then an example generic visualization 104 is shown on the right-hand side to illustrate how the disclosed technology may be utilized to encode and reproduce the mobile rideshare app's GUI as a generic visualization comprising generic visual representations of the GUI elements that existed within the mobile rideshare app's GUI at the given time.

As demonstrated by the example shown in FIG. 1, the disclosed technology may be utilized to provide a software provider's personnel with visibility into the appearance of a client application's GUI while avoiding the privacy and bandwidth concerns that are implicated by screen recordings or periodic screenshots of the client application's GUI. Indeed, by encoding the GUI elements within the client application's GUI using generic information such as type, position, and size and then reproducing those GUI elements using generic visual representations rather than the actual GUI elements themselves, the disclosed technology avoids any risk of capturing or transmitting sensitive information about the end user. Further, by encoding each GUI element within the client application's GUI in the form a targeted set of information for rendering a generic visual representation of the GUI element, which may then be translated into the generic visual representation by the back-end platform, the disclosed technology may significantly reduce the bandwidth that is required to report the dataset that encodes the generic visualization relative to a screen recording or a screenshot. In fact, depending on the manner in which the information for rendering the generic visual representations of the GUI elements is encoded and the number of GUI elements to be represented within the generic visualization, the dataset that encodes the generic visualization may have a data size on the order of hundreds of bytes (and perhaps less than 200 bytes). Further details regarding the manner in which the information for rendering the generic visual representations of the GUI elements may be encoded are provided below.

In at least some implementations, in addition to encoding generic visualizations of the given client application's GUI, the given client application may also be programmed with the capability to encode visual representations of end-user interactions with the given client application's GUI. For instance, in response to detecting a given end-user interaction with the given client application's GUI at a given time, the given client application may function to (i) determine information for rendering a visual representation of the given end-user interaction with the given client application's GUI at the given time (e.g., a type of the given end-user interaction and a position of the given end-user interaction within the GUI), and then (ii) encode the information for rendering the visual representation of the given end-user interaction into a respective data structure for the given end-user interaction. Thereafter, the given client application may report the generated dataset that encodes the visual representation of the given end-user interaction to the back-end platform—perhaps along with other information about the runtime session—and the back-end platform can then utilize that dataset to reproduce the visual representation of the of the end-user interaction from the given time and cause it to be presented to individuals that are evaluating the runtime session of the client application.

Figure 2:
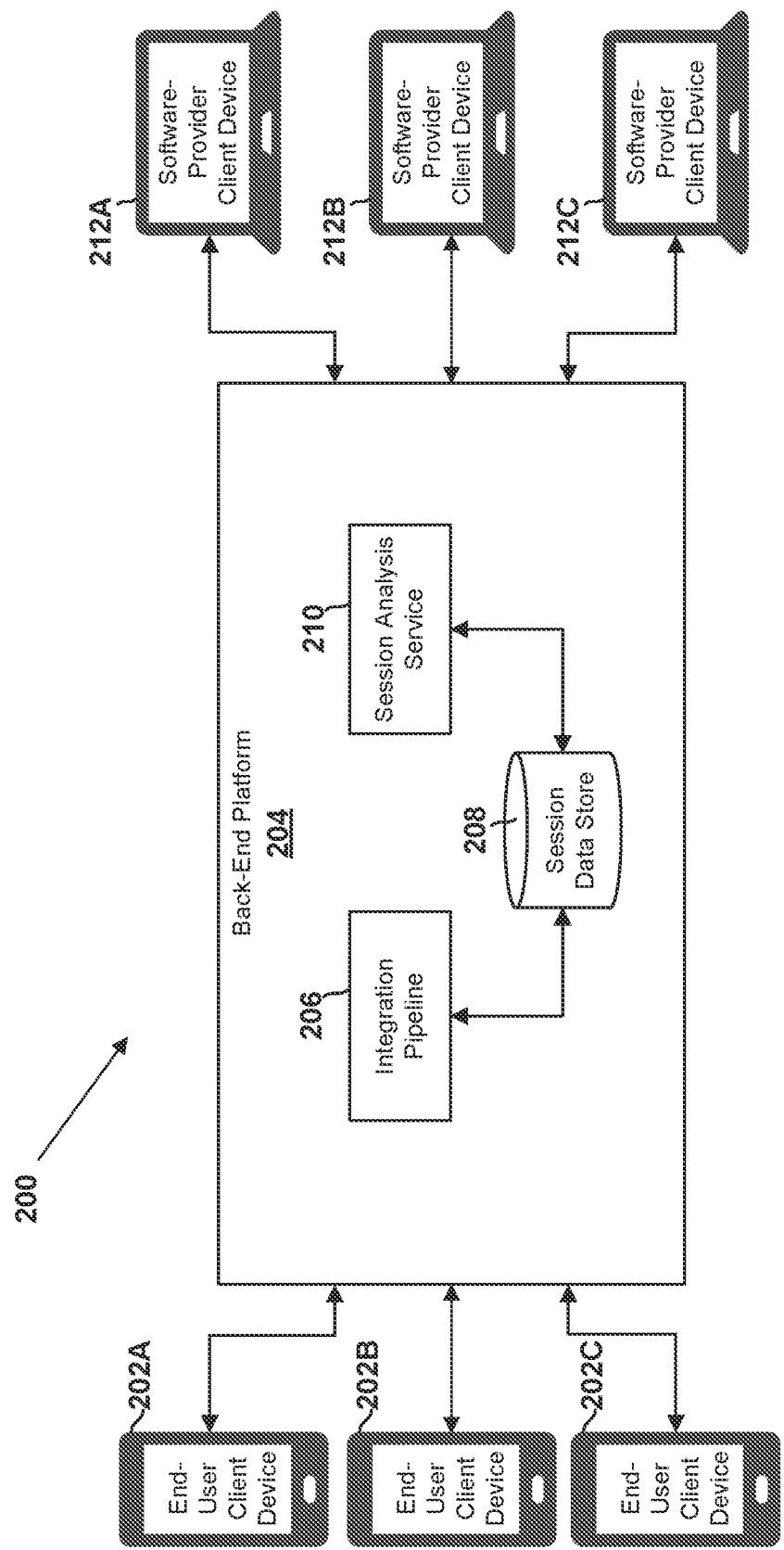
FIG. 2 is a block diagram that illustrates one example of an example network environment in which the disclosed technology for encoding and reproducing generic visualizations of a client application's GUI may be implemented.

Turning now to FIG. 2, a simplified block diagram is provided that illustrates an example network environment 200 in which the disclosed technology for encoding and reproducing generic visualizations of a client application's GUI may be implemented. As shown in FIG. 2, the example network environment 200 may include a plurality of end-user client devices 202 that are installed with a given client application that has been released by a given software provider, of which end-user client devices 202A, 202B, and 202C are shown as representative examples, a back-end platform 204 of the given software provider, and a plurality of software-provider client devices 212, of which software-provider client devices 212A, 212B, and 212C are shown as representative examples. Further, while the disclosed technology is at times described below with reference to the end-user device 202A and the software-provider client device 212A, it should be understood that the discussion may be applicable to any of the end-user devices 202A-C and any of the software-provider client devices 212A-C shown in FIG. 2.

In line with the discussion above, the given client application that is installed on each of the end-user client devices 202A-C can take any of various forms, including but not limited to any of the different forms of client applications described above (e.g., a mobile application, desktop application, web application, or the like). Further, in line with the discussion above, the given client application may incorporate the disclosed technology for encoding generic visualizations of the given client application's GUI.

In general, each of the end-user client devices 202A-C may take the form of any client device that is capable of running an instance of the given client application and carrying out the disclosed functionality for encoding generic visualizations of the given client application's GUI. In this respect, each of the end-user client devices 202A-C includes hardware components such as one or more processors, data storage, one or more communication interfaces, and input/output (I/O) components, among other possible hardware components. The end-user client devices 202A-C also include software components such as operating system software and the given client application, among various other possible software components. As representative examples, each of the end-user client devices 202A-C could be any of a smartphone, a tablet, a laptop, or a desktop computer, among other possibilities, and it should be understood that different end-user client devices 202A-C could take different forms (e.g., different types and/or models of client devices).

Further, as shown in FIG. 2, each of the end-user client devices 202A-C may be configured to communicate with the back-end platform 204 of the given software provider over a respective communication path. Each of these respective communication paths may generally comprise one or more data networks and/or data links, which may take any of various forms. For instance, each respective communication path between an end-user client device 202 and the back-end platform 204 may include any one or more of Personal Area Networks (PANs), Local Area Networks (LANs), Wide Area Networks (WANs) such as the Internet or cellular networks, cloud networks, and/or point-to-point data links, among other possibilities. Further, the data networks and/or links that make up each respective communication path may be wireless, wired, or some combination thereof, and may carry data according to any of various different communication protocols. Although not shown, the respective communication paths may also include one or more intermediate systems, examples of which may include a data aggregation system and host server, among other possibilities. Many other configurations are also possible.

As further shown in FIG. 2, the back-end platform 204 of the given software provider may comprise an integration pipeline 206, a session data store 208, and a session analysis service 210, among other possibilities. Each of these functional components of the back-end platform 204 may be configured to perform certain back-end functionality in accordance with the present disclosure.

For instance, the integration pipeline 206 of the back-end platform 204 may generally be configured to (i) receive information for runtime sessions of the given client application that was captured and reported by the end-user client devices 202A-C, (ii) prepare such information for storage in the session data store 208 and subsequent use by the session analysis service 210, wherein such preparation may involve performing certain pre-processing operations on the received information (e.g., validation, cleansing, deduplication, filtering, aggregation, summarization, enrichment, restructuring, reformatting, translation, mapping, etc.), and then (iii) write the received information for the runtime sessions of the given client application to the session data store 208, which may then be accessible by the session analysis service 210 as well as other functional subsystems of the back-end platform 204. In this respect, the received information for each runtime session of the given client application may take any of various forms, examples of which may include session details, log information, and/or associated contextual information of various types, and in accordance with the present disclosure, such contextual information will preferably include datasets that encode generic visualizations of the given client application's GUI.

Further, the session analysis service 210 of the back-end platform 204 may generally be configured to perform back-end functionality for enabling users associated with the given software provider to review and analyze information for runtime sessions of the given client application (e.g., log information and/or associated contextual information), which may involve (i) receiving a request from a given software-provider client device 212 to access information for a given runtime session of the given client application, (ii) retrieving certain information for the given runtime session of the given client application from the session data store 208 (e.g., session details, log information, and/or associated contextual information), and (iii) transmitting a response to the given software-provider client device 212 that comprises instructions and/or data for presenting the retrieved information for the given runtime session of the given client application, among other possible back-end functions related to the review and analysis of information for a runtime session that may be performed by the session analysis service 210.

In practice, the back-end platform 204 of the given software provider may comprise some set of physical computing resources (e.g., processors, data storage, etc.) utilized to implement the foregoing functional subsystems. This set of physical computing resources may take any of various forms. As one possibility, the back-end platform 204 may comprise cloud computing resources supplied by a third-party provider of "on demand" cloud computing resources, such as Amazon Web Services (AWS), Amazon Lambda, Google Cloud Platform (GCP), Microsoft Azure, or the like. As another possibility, the back-end platform 204 may comprise "on-premises" computing resources of the given software provider (e.g., servers owned by the given software provider). As yet another possibility, the back-end platform 204 may comprise a combination of cloud computing resources and on-premises computing resources. Other implementations of the back-end platform 204 are possible as well.

Further, in practice, the functional components of the example back-end platform 204 may be implemented using any of various software architecture styles, examples of which may include a microservices architecture, a service-oriented architecture, and/or a serverless architecture, among other possibilities, as well as any of various deployment patterns, examples of which may include a container-based deployment pattern, a virtual-machine-based deployment pattern, and/or a Lambda-function-based deployment pattern, among other possibilities.

Turning lastly to the software-provider client devices 212A-C, each of the software-provider client devices 212A-C may generally take the form of any client device that is capable of running front-end software for accessing and interacting with the session analysis service 210, such as front-end software for a session analysis tool. In this respect, each of the software-provider client devices 212A-C may include hardware components such as one or more processors, data storage, one or more communication interfaces, and I/O components, among other possible hardware components, as well as software components such as operating system software and front-end software that is capable of interfacing with the session analysis service 210 (e.g., a mobile application, desktop application, or web browser), among various other possible software components. As representative examples, each of the software-provider client devices 212A-C could be any of a smartphone, a tablet, a laptop, or a desktop computer, among other possibilities, and it should be understood that different software-provider client devices 212A-C could take different forms (e.g., different types and/or models of client devices).

Further, each of the software-provider client devices 212A-C may be configured to communicate with the back-end platform 204 of the given software provider over a respective communication path that may take a similar form to the respective communication paths between the end-user client devices 202A-C may and the back-end platform 204.

Figure 3:
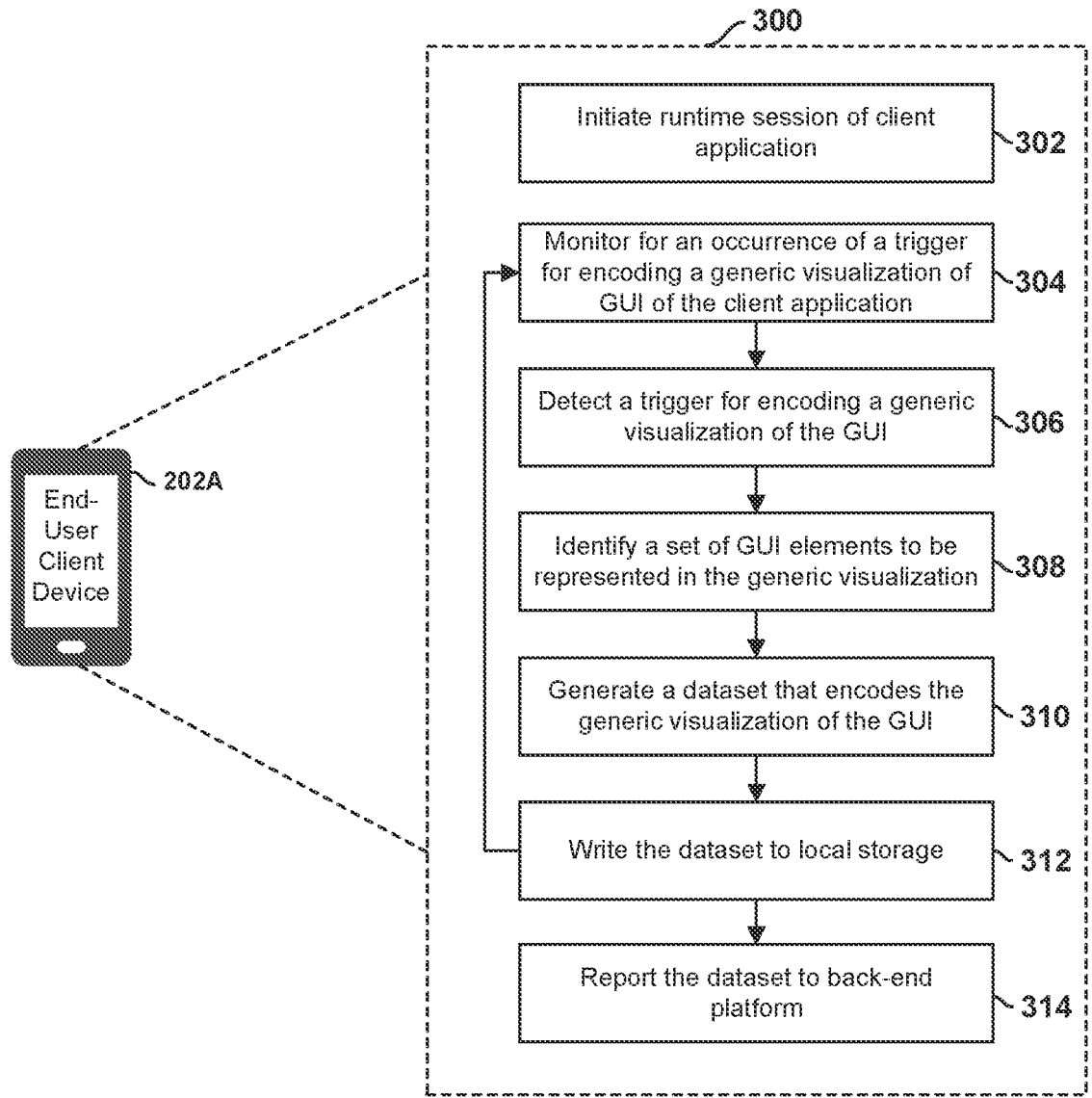
FIG. 3 is a flow diagram that illustrates some example operations that may be carried out by an example end-user client device in accordance with the present disclosure.

Turning now to FIG. 3, a flow diagram 300 is provided to show some example operations that may be carried out by an end-user client device in accordance with the present disclosure. For purposes of illustration only, the operations are described as being carried out by the example end-user client device 202A of FIG. 1, which as noted above may be installed with a given client application that incorporates the disclosed technology for encoding generic visualizations of the client application's GUI. It should be understood, however, that this functionality may be carried out by any client device that is installed with a client application that incorporates the disclosed technology for encoding generic visualizations of the client application's GUI. Further, in line with the discussion above, it should be understood that the given client application may take any of various forms, including but not limited to any type of mobile or desktop application now known or later developed.

At block 302, the end-user client device 202A may initiate a given runtime session of the given client application, which may cause the end-user client device 202A to begin displaying a GUI of the given client application so as to enable an end user to interact with the given client application. The given client application's GUI may comprise any of various types of GUI elements, examples of which may include images, textual display elements (e.g., labels), web content, maps, calendars, control elements such as text input fields, buttons, sliders, switches, navigational controls, or the like, and other visual display elements such as containers, popup windows, toolbars, or the like, among various other possible types of GUI elements that may be included within the given client application's GUI. These GUI elements may be defined by an underlying set of software objects that are typically referred to as "views." In practice, this set of views that defines the GUI elements within the given client application's GUI may be arranged into a hierarchical structure that may be referred to as a "view hierarchy." This view hierarchy generally takes the form of a nested, tree-like structure that defines the parent-child relationships between the views underlying the given client application's GUI, which in turn dictates the rendering order of the GUI elements within the given client application's GUI. In particular, a GUI is typically rendered by starting at the top level of the view hierarchy and then progressing down the levels of the view hierarchy to the bottom, such that GUI elements defined by views at higher levels of the view hierarchy are typically rendered at "lower" layers of the GUI and GUI elements defined by views at lower levels of the view hierarchy are typically rendered at "higher" layers of the GUI that are overlaid on top of the GUI elements in the lower layers.

The GUI elements within the given client application's GUI may change at various times throughout the course of the given runtime session. For instance, the given client application may update its GUI to show different GUI elements in response to receiving input from an end user, receiving network messages from the back-end platform 204, and/or detecting some other state change within the given client application (e.g., detecting the expiration of a timer), among other possible occurrences that may cause the GUI elements within the given client application's GUI to change. In this respect, a change to the GUI elements within the given client application's GUI could take any of various forms, examples of which may include changing the positioning and/or size of one or more GUI elements within the GUI, changing the visual appearance of one or more GUI elements within the GUI (e.g., by changing the shape or color of the GUI element or the information presented by the GUI element), adding one or more new GUI elements to the GUI, and/or removing one or more GUI elements from the GUI, among other possible types of changes to the given client application's GUI. Further, in practice, such a change to the GUI elements within the given client application's GUI may be effected by updating the view hierarchy underlying the given client application's GUI in accordance with the desired change and then re-rendering at least the updated portion of the view hierarchy, among other possible ways of effecting a change to the GUI elements within the given client application's GUI. Each time such a change is made to the GUI elements within the given client application's GUI, the given client application's GUI may be said to have a new "GUI state," which may then remain in existence until the next occurrence that causes the GUI elements within the given client application's GUI to change.

Figure 4A:
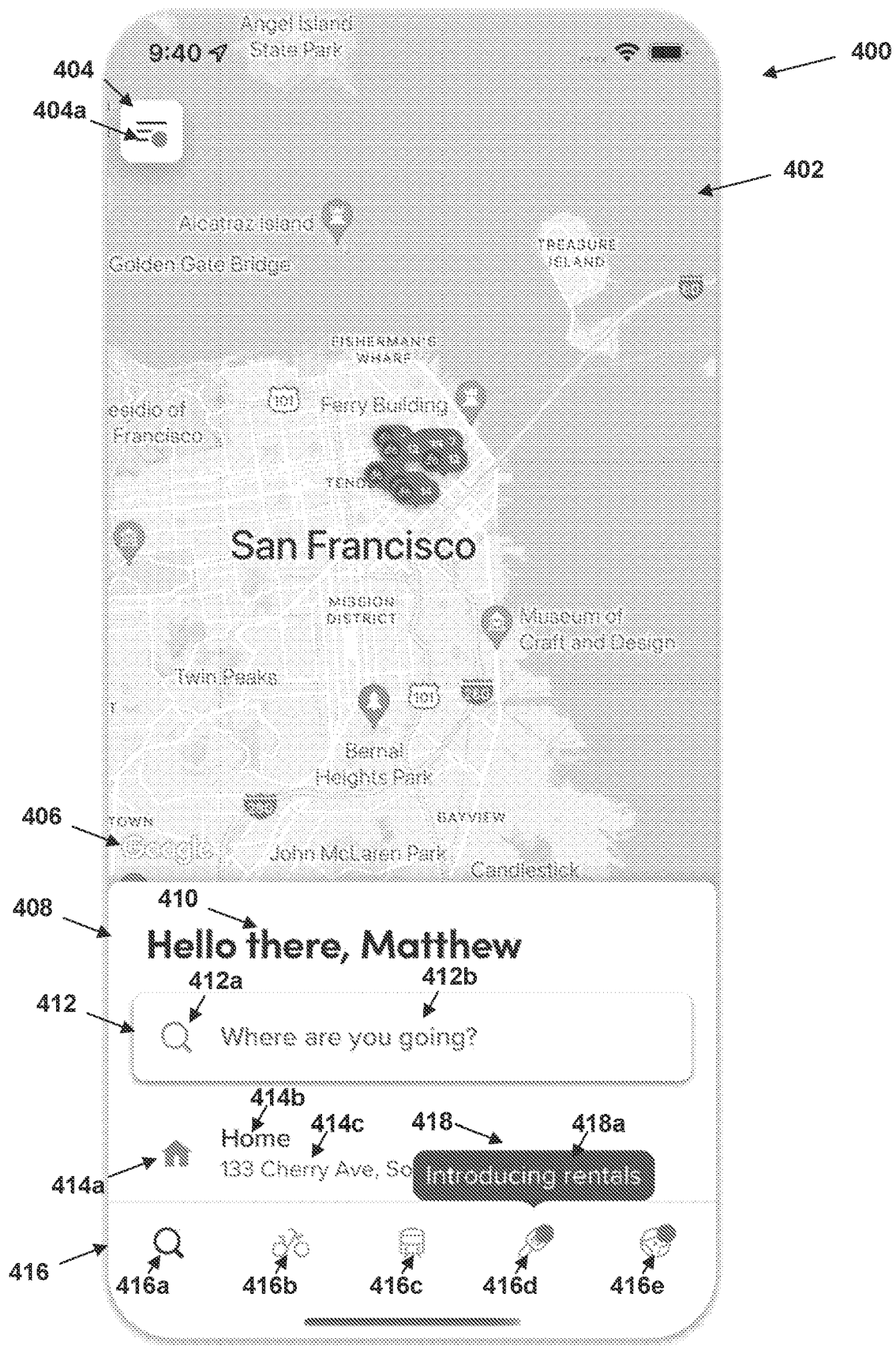
FIG. 4A is a diagram that illustrates an example GUI of an example client application that takes the form of a mobile rideshare application.

To illustrate with an example, FIG. 4A shows an example GUI 400 of a mobile rideshare app offered by Lyft, Inc. However, it should be understood that this discussion of a mobile rideshare app is merely provided for purposes of illustration, and that the disclosed technology is applicable to any of various types of mobile and desktop applications, including but not limited to other types of lifestyle apps (e.g., travel apps, restaurant apps, dating apps, etc.), social media apps, entertainment apps (e.g., music apps, video apps, book apps, etc.), gaming apps, news apps, and/or productivity apps, among many other possible examples.

As shown in FIG. 4A, this example GUI 400 of the mobile rideshare app includes a number of different GUI elements that are visible to an end user. For instance, as shown, the lowest visible layer of the example GUI 400 comprises a map element 402. In turn, the example GUI 400 may include several additional layers that are overlaid on top of the map element 402. For example, the map element 402 is overlaid with a container element 404 that contains a selectable image 404a for accessing a menu near the top-left corner of the map element 402. As another example, the map element 402 is overlaid with an image element 406 comprising a "Google" logo near the bottom-left corner of the visible portion of the map element 402, which indicates that Google is the provider of the map data that is displayed via the map element 402. As yet another example, the map element 402 is overlaid with a container element 408 on the bottom-third of the map element 402, which is in turn overlaid with various other GUI elements. For instance, moving from top to bottom, the container element 408 is overlaid with (i) a text element 410 comprising the text "Hello there, Mat-thew", (ii) a container element 412 that contains an image element 412a comprising a magnifying glass as well a text element 412b comprising the text "Where are you going?", which is selectable by the end user, (iii) an image element 414a and adjacent text elements 414b and 414c that collectively represent an available destination address that is selectable by the end user, which in this case is the end user's "Home" address of 133 Cherry Ave, South San Francisco, and (iv) a toolbar element 416 comprising five selectable images 416a-416e, each of which resides within a respective container element that is not visually delineated within the example GUI 400. Lastly, the selectable images 416d and 416e are each shown to have a circular image overlaid onto the selectable image that serves as a visual notification to the user, and a text popup element 418 containing a text element 418a comprising the text "Introducing rentals" is overlaying portions of the text element 414c and the toolbar element 416.

In line with the discussion above, this example GUI 400 of the mobile rideshare app may be defined by a view hierarchy, which comprises a hierarchical structure of views that define the GUI elements within the example GUI 400. To illustrate, FIG. 4B illustrates a simplified example of a view hierarchy 450 that may define the example GUI 400 of the mobile rideshare app that is shown in FIG. 4A.

Figure 4B:
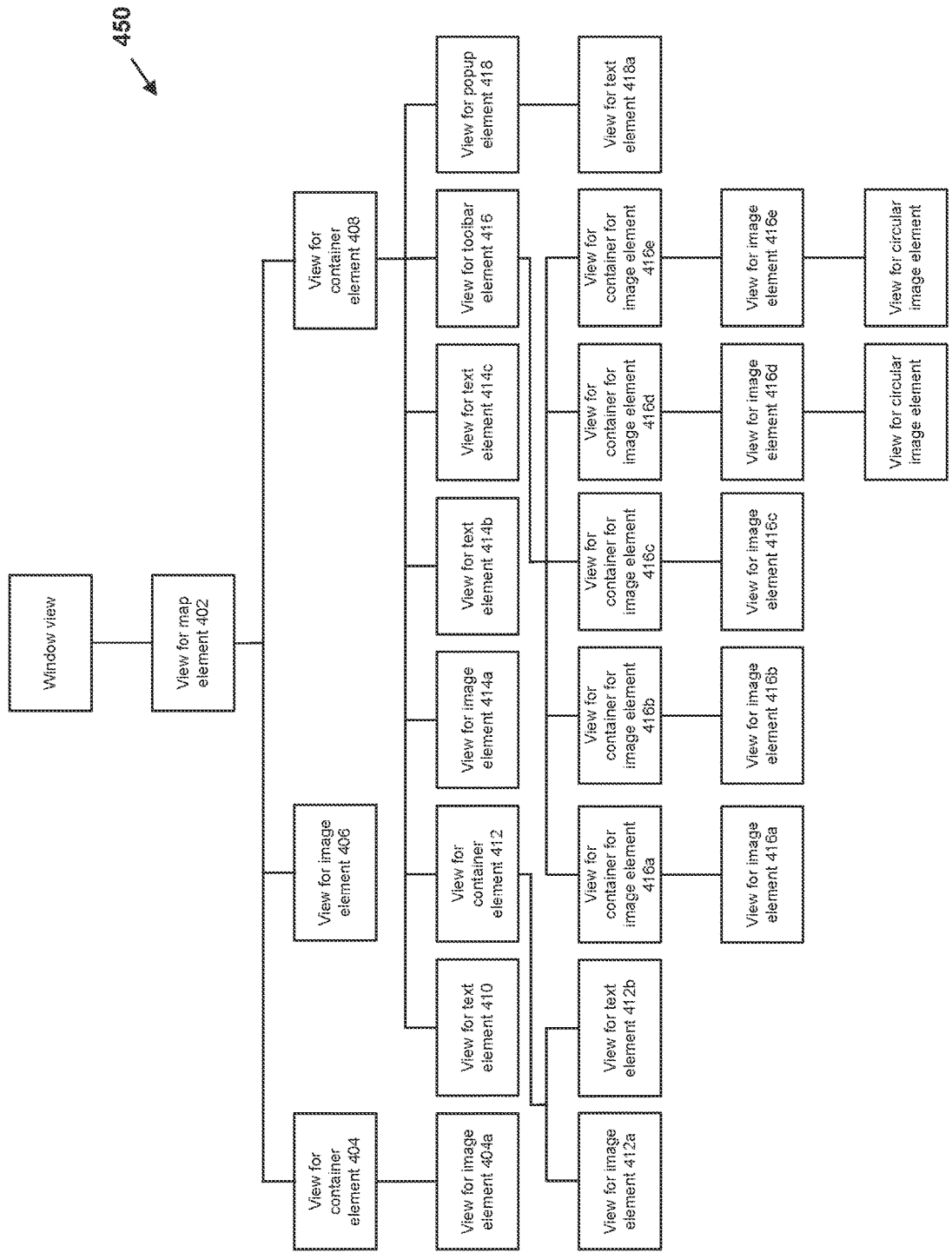
FIG. 4B is a diagram that illustrates a simplified example of a view hierarchy that may define the example GUI of FIG. 4A.

As shown in FIG. 4B, the top level of the example view hierarchy 450 for the example GUI view 400 may comprise a "Window" view that represents a displayed window on a client device's screen, which serves as a container for the other GUI elements within the GUI. That "Window" view may have a single child view, which is a view that defines the map element 402. In turn, the map view that defines the map element 402 is shown to have three child views: (i) a view that defines the container element 404, (ii) a view that defines the image element 406 comprising the Google logo, and (iii) a view that defines the container element 408. Moving to the next level of the example view hierarchy 450, the view that defines the container element 404 is shown to have a single child view that defines the selectable image icon 404a, and the view that defines the container element 408 is shown to have seven child views: (i) a view that defines the text element 410, (ii) a view that defines the container element 412, (iii) a view that defines the image element 414a, (iv) a view that defines the text element 414b, (v) a view that defines the text element 414c, (vi) a view that defines the toolbar element 416, and (vii) a view that defines the text popup element 418. In turn, the view that defines the container element 412 is shown to have two child views, which are a view that defines the image element 412a and a view that defines the selectable text element 412b, the view that defines the toolbar element 416 is shown to have five child views that define the container elements for the five selectable image elements 416a-416e, and the view for the text popup element 418 is shown to have one child view that defines the text element 418a. Lastly, the five views that define the container elements for the five selectable image elements 416a-416e may each have a child view that defines one of the selectable image elements 416a-416e, and the view that defines each of the selectable images 416d and 416e is shown to have a child view that defines the circular image overlaid onto the selectable image.

Each of the foregoing views may take any of various forms, which may depend in part on the operating system for which the given client application has been programmed. For instance, the view for the map element 402 could comprise an instance of the UIMapView class if the given client application is programmed for iOS or an instance of the MapView class if the given client application is programmed for Android, among various other possibilities. Further, the views for container elements 404, 408, 412, the toolbar element 416, the container elements for the selectable image elements 416a-416e, and the text popup element 418 may each comprise an instance of the general UIView class if the given client application is programmed for iOS or an instance of a subclass within the general ViewGroup class if the given client application is programmed for Android, among various other possibilities. Further yet, the views for the image elements 404a, 406, 412a, 414a, and 416a-e may each comprise an instance of the UIImageView or UIImage class if the given client application is programmed for iOS or an instance of the ImageView or Image class if the given client application is programmed for Android, among various other possibilities. Still further, the text view for text elements 412b, 414b, 414c, and 418a may each comprise an instance of the UILabel or UITextView class if the given client application is programmed for iOS or an instance of the TextView class if the given client application is programmed for Android, among various other possibilities.

While FIG. 4B illustrates an example view hierarchy 450 comprising views for the GUI elements within the example GUI 400 that are visible to an end user, it should be understood that, in practice, the view hierarchy for the given client application's GUI may comprise certain other views defining GUI elements that are included as part of the given client application's GUI but are not visible to an end user. For example, the view hierarchy for the example GUI 400 could include views defining GUI elements that do not have any visual appearance, such as views defining invisible container elements that are included in the view hierarchy by software developers for purposes of handling user input events and/or organizing views for other GUI elements within the view hierarchy, among other possible purposes of including views for invisible GUI elements within the view hierarchy. As another example, the view hierarchy for the example GUI 400 could include views defining GUI elements that do have a visual appearance, but are fully obscured by other GUI elements that are layered on top of such GUI elements. Other examples are possible as well.

Figure 4C:
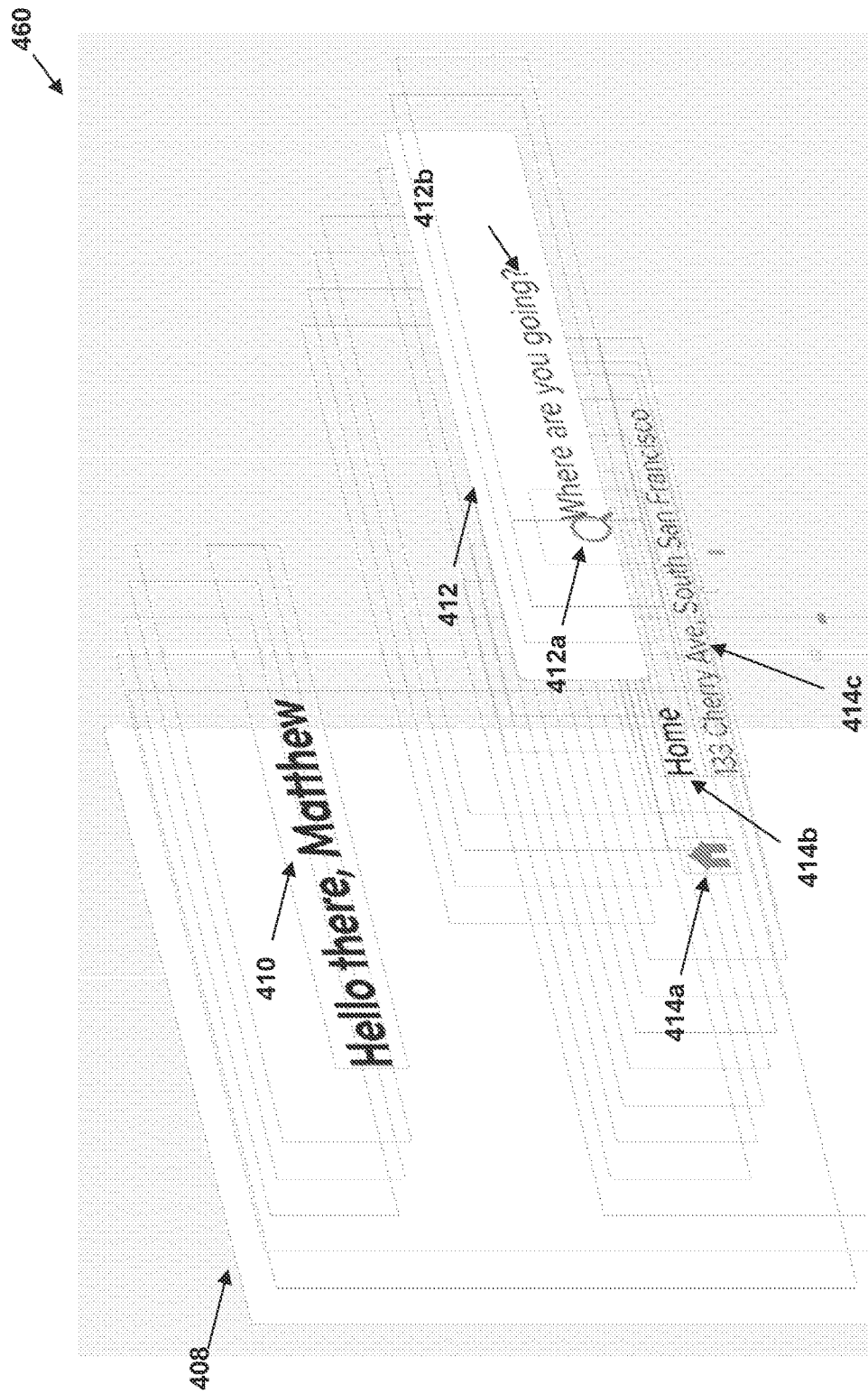
FIG. 4C shows a visualization of an example portion of an example view hierarchy that may define the GUI elements within a given portion of the example GUI of FIG. 4A.

To illustrate, FIG. 4C shows a visualization of an example portion of an example view hierarchy 460 that may define the GUI elements within a given portion of the example GUI 400 shown in FIG. 4A. As shown in FIG. 4C, this example view hierarchy 460 may include views for the visible GUI elements within this portion of the example GUI 400, including the container element 408, the text element 410 comprising the text "Hello there, Matthew", the container element 412, the image element 412a comprising the magnifying glass, the text element 412b comprising the text "Where are you going?", the image element 414a, and the text elements 414b and 414c. However, in addition to the views for these visible GUI elements, the example view hierarchy 460 also includes a number of additional views for GUI elements that are not visible to an end user. For example, FIG. 4C shows that the example view hierarchy 460 may include views for several additional layers of invisible container elements that are situated between the layers comprising the visible GUI elements in this portion of the example GUI 400.

The view hierarchy for the example GUI 400 could take various other forms as well, including but not limited to the possibility that the view hierarchy for the example GUI 400 may include various other views that are not visible to an end user. Further, the example GUI 400 could be defined using other types and/or arrangements of software objects as well.

After the given runtime session of the given client application is initiated, the given client application may be configured to carry out certain functionality in order to provide the software provider with visibility into the behavior of the given client application, which may involve capturing and reporting log information for the given runtime session and perhaps also capturing and reporting certain types of contextual information for the given runtime session, among other possibilities. Further, in accordance with the present disclosure, this functionality may involve capturing and reporting datasets that encode generic visualizations of the given client application's GUI, which may subsequently be utilized by the back-end platform 104 to construct and present generic visualizations of the given client application's GUI as an additional form of contextual information for runtime sessions of the given client application. This functionality will now be described in further detail with reference to blocks 304-314.

For instance, starting at block 304, the given client application running on the end-user client device 202A may begin monitoring for an occurrence of a trigger that, if detected, is to cause the given client application to encode a generic visualization of the given client application's GUI. In this respect, the given client application's GUI could be configured to monitor for occurrences of any of various types of triggers for encoding a generic visualization of the given client application's GUI may take any of various forms.

For instance, as one possibility, the given client application may be configured to monitor for occurrences of one or more types of event-based triggers for encoding a generic visualization of the given client application's GUI, where such an event-based trigger could take the form of (i) a change to the GUI elements within the GUI (in which case the given client application may be triggered to encode a new generic visualization of the given client application's GUI each time it transitions to a new GUI state), (ii) generation of a log entry (in which case the given client application may be triggered to encode a new generic visualization of the given client application's GUI each time it generates a new log entry), and/or (iii) initiation of the given runtime session of the given client application (in which case the given client application may encode a first generic visualization of the given client application's GUI at the time that the given client application is initially launched), among other possible examples of event-based triggers that may cause the given client application to encode a generic visualization of the given client application's GUI.

As another possibility, the given client application may be configured to monitor for occurrences of one or more types of time-based triggers for encoding a generic visualization of the given client application's GUI, where such a time-based trigger could take the form of (i) a trigger that is scheduled to occur at regular time intervals (e.g., every 1 second) and/or (ii) a trigger that is scheduled to occur at a specific point in time, among other possible examples of time-based triggers that may cause the given client application to encode a generic visualization of the given client application's GUI.

The given client application may monitor for occurrences of other types of triggers for encoding a generic visualization of the given client application's GUI as well.

Turning to block 306, while monitoring for a trigger that is to cause the given client application to encode a generic visualization of the given client application's GUI, the given client application running on the end-user client device 202A may detect a first occurrence of such a trigger at a first time during the given runtime session. In line with the discussion above, this first trigger occurrence could take the form of either an event-based trigger (e.g., a change to the GUI elements within the GUI, the generation of a new log entry, the initiation of the given runtime session of the given client application, etc.) or a time-based trigger (e.g., the start of a next regular interval for encoding a generic visualization), among other possibilities.

In response to detecting the first trigger occurrence at the first time, the given client application running on the end-user client device 202A may then function to encode a generic visualization of the given client application's GUI—and more particularly, a generic visualization of the given client application's GUI state at the first time when the first trigger occurrence is detected. (In practice, the GUI state "at the first time" refers to the GUI state as it exists immediately following the specific instant of time when the trigger is actually detected). This functionality of encoding the generic visualization of the given client application's GUI state at the first time may take various forms, and in at least some embodiments, may involve (i) identifying a set of GUI elements to be represented in the generic visualization of the GUI state and (ii) generating a dataset that encodes the generic visualization of the GUI state.

For instance, as shown at block 308, the given client application running on the end-user client device 202A may identify a set of GUI elements to be represented in the generic visualization of the given client application's GUI state. The end-user client device 202A may identify the set of GUI elements to be represented in the generic visualization of the given client application's GUI state in various ways.

As one possible implementation, the given client application running on the end-user client device 202A may identify the set of GUI elements to be represented in the generic visualization of the given client application's GUI state based on an inspection of the current view hierarchy for the given client application's GUI, which as noted above comprises a hierarchical structure of views that define the GUI elements within the GUI state. In this respect, the primary goal of the inspection of the current view hierarchy may be to distinguish between (i) views defining GUI elements within the GUI state that are visible to an end user, which are to represented in the generic visualization of the given client application's GUI state, and (ii) views defining GUI elements within the GUI state that are not visible to the end user, which are not to be represented in the generic visualization of the given client application's GUI state. This inspection may take any of various forms.

As one possibility, the given client application's inspection of the view hierarchy may start with the top level of the view hierarchy (which corresponds to the bottom layer of the GUI) and then progress down the view hierarchy, level-by-level, until reaching the bottom level of the view hierarchy (which corresponds to the top layer of the GUI). At each respective level of the view hierarchy, the given client application may first inspect the views at that respective level in order to identify any view defining a GUI element that may be a candidate for inclusion in the set of GUI elements to be represented in the generic visualization of the GUI state (e.g., views defining GUI elements within the GUI state that are potentially visible to an end user). In this respect, while inspecting the views at a respective level of the view hierarchy, the given client application may evaluate any of various attributes of each respective view in order to determine whether the respective view defines a candidate GUI element, examples of which may include the type of the respective view (which may be indicated by the view's class) and perhaps one or more attributes that specify the visual appearance of the GUI element defined by the respective view, such as whether the defined GUI element is hidden, whether the defined GUI element is opaque or transparent, whether the defined GUI element has a shadow or border, etc.

After inspecting the views at a respective level of the view hierarchy to identify any view defining a candidate GUI element, the given client application may then add each identified view to a set of candidate views. Additionally, along with adding each newly-identified view to the set of candidate views, the given client application may also evaluate whether the GUI element(s) defined by the newly-identified views fully obscure a GUI element defined by a previously-identified view in the set of candidate views (i.e., a view that was previously identified based on in inspection of a higher level of the view hierarchy), and if so, the given client application may remove any such previously-identified view from the set of candidate view. To accomplish this, the given client application may look at various attributes of the GUI element(s) defined by the newly-identified views as compared to the GUI element(s) defined by the previously-identified views, examples of which may include position attributes, size attributes, and opacity attributes (at least for the GUI element(s) defined by the newly-identified views), among other possibilities.

The given client application may iterate through each level of the view hierarchy and carry out the foregoing functionality until it reaches the bottom level of the view hierarchy, at which point the given client application may utilize the final set of candidate views as a basis for identifying the set of GUI elements to be represented in the generic visualization of the given client application's GUI state.

To demonstrate with example, consider the example view hierarchy 460 that is illustrated in FIG. 4C, which defines the GUI elements within one portion of the example GUI 400 illustrated in FIG. 4A. In FIG. 4C, the highest level of the illustrated view hierarchy 460 is a view defining the container element 408 that is at the lowest layer of the portion of the example GUI depicted in FIG. 4C. However, it should be understood that the view hierarchy for the example GUI 400 also has higher levels comprising views that define other, lower levels of the example GUI 400 that are not depicted in FIG. 4C, such as the view defining the map 402.)

In accordance with the foregoing functionality, the given client application may start by inspecting this level of the example view hierarchy 460, which may result in the container element 408 being added to a set of candidate views. In turn, the given client application may progress through the subsequent levels of the example view hierarchy 460, one by one, in order to identify other views that are to be added to the set of candidate views. During this process, some views of the example view hierarchy 460 illustrated in FIG. 4C may be ignored (e.g., due to the view defining a GUI element that does not have any visual appearance), other views of the example view hierarchy 460 illustrated in FIG. 4C may be initially added to the set of candidate views and then later removed based on a determination that the GUI elements defined by such views are fully obscured by GUI elements defined by views at lower levels of the view hierarchy, and still other views of the example view hierarchy 460 illustrated in FIG. 4C may be added to the set of candidate views and then remain in that set of candidate views until the conclusion of the inspection. As a result of this functionality, the final set of candidate views may include the views defining the text element 410 comprising the "Hello there, Matthew" text, the container element 412, the image element 412a, the text element 412b comprising the "Where are you going" text, the image element 414a, and the text elements 414b and 414c, and these GUI elements may then be included in the identified set of GUI elements to be represented in the generic visualization of the example GUI 400.

The functionality of inspecting the current view hierarchy for the given client application's GUI in order to identify the set of GUI elements to be represented in the generic visualization of the given client application's GUI state may take various forms as well. For instance, instead of starting with the top level of the view hierarchy and then progressing down the view hierarchy, level-by-level, until reaching the bottom level of the view hierarchy, the given client application may inspect the views of the view hierarchy in some other manner—such as by starting the inspection from the bottom level rather than the top level or by first identifying which views are of interest (e.g., based on view type) and then evaluating those views relative to one another (e.g., based on level of the hierarchy and the attributes specifying visual appearance), among various other possibilities.

Further, other techniques for identifying the set of GUI elements to be represented in the generic visualization of the given client application's GUI state that do not involve an inspection of the current view hierarchy of the given client application's GUI could be employed as well. For instance, instead of inspecting the current view hierarchy of the given client application's GUI, the given client application could identify the set of GUI elements to be represented in the generic visualization of the given client application's GUI state by capturing a screenshot of the GUI state and then applying object detection techniques to the captured screenshot (e.g., using trained object detection models that are configured to detect and classify certain types of GUI elements within a screenshot) in order to identify the GUI elements to be represented in the generic visualization of the given client application's GUI state. Other techniques may be utilized as well.

At block 310, after identifying the set of GUI elements to be represented in the generic visualization of the given client application's GUI state, the given client application running on the end-user client device 202A may generate a dataset that encodes the generic visualization of the given client application's GUI state. In accordance with the present disclosure, this generated dataset may comprise a respective data structure for each identified GUI element that encodes information for rendering a generic visual representation of the identified GUI element. This information for rendering a generic visual representation of an identified GUI element that is encoded into a respective data structure for the identified GUI element may take various forms.

As one possibility, the information for rendering a generic visual representation of an identified GUI element that is encoded into the identified GUI element's respective data structure may include type information for the identified GUI element, which may take the form of a numeric indicator of the identified GUI element's type, among other possibilities. In this respect, the type of the identified GUI element that is indicated by the type information could take any of various forms, examples of which may include an image, an icon, an button, a label, a text view, an input field, map, generic view, etc.).

As another possibility, the information for rendering a generic visual representation of an identified GUI element that is encoded into the identified GUI element's respective data structure may include position information for the identified GUI element, which may take the form of a horizontal coordinate and a vertical coordinate of the identified GUI element within the GUI (e.g., x- and y-coordinates within a coordinate system of the GUI), among other possibilities.

As yet another possibility, the information for rendering a generic visual representation of an identified GUI element that is encoded into the identified GUI element's respective data structure may include size information for the identified GUI element, which may take the form of a width and a length of the GUI element (e.g., as measured according to a coordinate system of the GUI), among other possibilities.

The information for rendering a generic visual representation of an identified GUI element that is encoded into the identified GUI element's respective data structure may take other forms as well.

Further, the information for rendering a generic visual representation of an identified GUI element that is encoded into the identified GUI element's respective data structure may be determined in various manners.

For instance, in at least some implementations, the type information for an identified GUI element may be determined by (i) determining the type of the identified GUI element based on an inspection of the view that defines the identified GUI element and perhaps also other surrounding views within the current view hierarchy for the given client application's GUI, and then (ii) translating the determined type of the identified GUI element into a numeric indicator of the determined type. In this respect, the function of determining the type of the identified GUI element may begin with an inspection of the type of view that defines the identified GUI element (e.g., as indicated by the view's class), which in some cases may yield sufficient information to enable the given client application to determine the identified GUI element's type. To illustrate with an example, if an identified GUI element is defined by a map view (e.g., an instance of UIMapView, MapView, or the like), the given client application may determine that the identified GUI element is a map element. Along similar lines, a GUI element defined by an image view (e.g., an instance of UIImageView, UIImage, ImageView, Image, or the like) indicates an image element, a GUI element defined by a text view (e.g., an instance of UILabel, UITextView, TextView, or the like) indicates a textual display element, and a GUI element defined by a specific type of control view such as a button view (e.g., an instance of UIButton or Button) indicates a corresponding type of control element such as a button.

However, in other cases, inspecting the type of view that defines the identified GUI element may not yield sufficient information to enable the given client application to determine the identified GUI element's type. For example, an identified GUI element could be defined by a view that comprises an instance of a general class such as UIView or a subclass of ViewGroup, in which case the given client application may be unable to determine the identified GUI element's type based on the type of view that defines the identified GUI element. In these cases, the given client application may then infer the identified GUI element's type based on inspection of one or both of (i) other attributes of the view that defines the identified GUI element and/or (ii) other surrounding views within the current view hierarchy for the given client application's GUI. For instance, the given client application may infer the identified GUI element's type based on factors such as the type of the parent view to the view that defines the identified GUI element, the type of a child view to the view that defines the identified GUI element, the position and/or size of the view that defines the identified GUI element relative to its parent view or a child view, and/or other attributes specifying the visual appearance of the view that defines the identified GUI element, its parent view, and/or a child view, among various other possibilities.

The type information for an identified GUI element may be determined in other manners as well.

Further, in at least some implementations, the position information for an identified GUI element may be determined by retrieving the horizontal and vertical coordinates specified by the view that defines the identified GUI element, which are typically represented according to a coordinate system of the view's parent view, and then converting those coordinates into a reference coordinate system for the GUI such as a screen or window coordinate system. However, the position information for an identified GUI element may be determined in other manners as well.

Further yet, in at least some implementations, the size information for an identified GUI element may be determined by retrieving width and length attributes specified by the view that defines the identified GUI element. However, the size information for an identified GUI element may be determined in other manners as well.

The information for rendering a generic visual representation of an identified GUI element that is encoded into the identified GUI element's respective data structure may be determined in other manners as well.

Further yet, the manner in which the information for rendering a generic visual representation of an identified GUI element is encoded into a respective data structure for the identified GUI element may take any of various forms.

As one possible implementation, the given client application running on the end-user client device 202A may encode the information for rendering a generic visual representation of an identified GUI element into a data structure comprising a variable-length sequence of bytes, where each respective piece of information for rendering the generic visual representation of the identified GUI element is encoded by at least one byte within the sequence and certain pieces of information may be encoded by multiple bytes within the sequence depending on the value of such pieces of information. For instance, in a scenario where the information for rendering a generic visual representation of an identified GUI element comprises (i) a numeric indicator of the identified GUI element's type, (ii) a horizontal coordinate of the identified GUI element within the GUI, (iii) a vertical coordinate of the identified GUI element within the GUI, (iv) a width of the identified GUI element, and (v) a height of the identified GUI element, the respective data structure for the identified GUI element may comprise a sequence of bytes in which each of these five pieces of information is encoded by at least one byte within the sequence and certain of these pieces of information may be encoded by multiple bytes within the sequence depending on the value of such pieces of information. Many other examples are possible as well.

In this implementation, the number of bytes used to encode certain pieces of information could be fixed at a single byte, whereas the number of bytes used to encode other pieces of information could vary between a single byte or multiple bytes from GUI element to GUI element depending on the value of such pieces of information, which is due to the fact that a single byte can only encode up to 256 different values and certain pieces of information could be of a type that can have more than 256 possible values.

For instance, if a piece of information is of a type that does not have more than 256 possible values, then the number of bytes used to encode that piece of information may be fixed at a single byte. One example of such information is a numeric indicator of the identified GUI element's type, as the total number of possible GUI element types that can be identified and encoded will typically be less than 256, and as such, any possible value of the numeric indicator of the identified GUI element's type will fit within a single byte.

On the other hand, if a piece of information is of a type that can have more than 256 possible values, then the number of bytes used to encode the piece of information may be variable from GUI element to GUI element depending on the particular value of that piece of information—if the value is one of the first 256 possible values for that type of information, then a single byte can be used to encode the piece of information, but otherwise two bytes (or perhaps more) will be required to encode the piece of information. Examples of such information may include a horizontal coordinate of the identified GUI element within the GUI, a vertical coordinate of the identified GUI element within the GUI, a width of the identified GUI element, and a height of the identified GUI element—each of these pieces of information may be defined in terms of a numeric scale having more than 256 possible values (e.g., a coordinate system with more than 256 possible points horizontally and more than 256 possible points vertically), and may thus be encoded using either a single byte or two bytes depending on the particular value.

For instance, if a vertical coordinate and/or a height of the identified GUI element is represented according to a coordinate system having a vertical axis ranging from 0 to some value greater than 255 (e.g., 844 vertical points), then a vertical coordinate or height having a value between 0 and 255 may be encoded using a single byte, whereas a vertical coordinate or height having a value above 255 will be encoded using two bytes. Along similar lines, if a horizontal coordinate and/or a width of the identified GUI element is represented according to a coordinate system having a horizontal axis ranging from 0 to some value greater than 255 (e.g., 390 horizontal points), then a horizontal coordinate or width having a value between 0 and 255 may be encoded using a single byte, whereas a horizontal coordinate or width having a value above 255 will be encoded using two bytes.

Further, in this implementation, the given client application running on the end-user client device 202A may additionally encode, within the sequence of bytes for the identified GUI element, an indication of how many bytes are utilized to encode the pieces of information for the identified GUI element that may occupy a variable number of bytes. For instance, in a scenario where the information for rendering the generic visual representation of the identified GUI element comprises (i) a numeric indicator of the identified GUI element's type, (ii) a horizontal coordinate of the identified GUI element within the GUI, (iii) a vertical coordinate of the identified GUI element within the GUI, (iv) a width of the identified GUI element, and (v) a height of the identified GUI element, then along with encoding such information within a variable-length sequence of bytes for the GUI element, the end-user client device 202A may additionally encode an indication of how many bytes are utilized to encode each of the pieces of information that could require more than a single byte—such as the horizontal coordinate, the vertical coordinate, the width, and the height of the identified GUI element, among other possibilities.

In this respect, the indication of how many bytes are utilized to encode certain pieces of information for the identified GUI element may be encoded within the sequence of bytes in various manners. For instance, as one possible approach, the indication of how many bytes are utilized to encode certain pieces of information for the identified GUI element could be encoded as a separate byte within the sequence of bytes, which may be included as the first byte within the sequence. In this approach, certain bits within the separate byte's sequence of eight bits may be designated for purposes of indicating how many bytes are utilized to encode certain pieces of information for the identified GUI element. For example, a first bit within the separate byte's sequence of eight bits (e.g., a most significant bit) may be designated to serve as an indicator of how many bytes are utilized to encode a first piece of information identified GUI element (e.g., a horizontal coordinate), a second bit within the separate byte's sequence of bits (e.g., a second-most significant bit) may be designated to serve as an indicator of how many bytes are utilized to encode a second piece of information for the identified GUI element (e.g., a vertical coordinate), and so on, where a bit value of 0 indicates that one byte is utilized to encode the respective piece of information and a bit value of 1 indicates that two bytes are utilized to encode the respective piece of information (or vice versa). As another example, it is possible that a pair of two bits within the separate byte's sequence of eight bits could be designated to serve as an indicator of how many bytes are utilized to encode a given piece of information that may require more than two bytes, in which case a two-bit value of 00 may indicate that one byte is utilized to encode the given piece of information, a two-bit value of 01 may indicate that two bytes are utilized to encode the given piece of information, and a two-bit value of 10 may indicate that three bytes are utilized to encode the given piece of information. The manner in which a separate byte may be used to indicate how many bytes are utilized to encode certain pieces of information for the identified GUI element may take other forms as well.

Alternatively, as another possible approach, the indication of how many bytes are utilized to encode certain pieces of information for the identified GUI element could be encoded in the same byte that is being utilized to encode some other piece of information for the identified GUI element if that other piece of information for the identified GUI element can be encoded without consuming an entire byte, which advantageously allows this information to be encoded into the sequence of bytes for the identified GUI element without increasing the overall number of bytes included in the sequence of bytes. For instance, in a scenario where there are only a limited number of possible types of GUI elements that may be identified and encoded, such as 16 or less total possible types of GUI elements, then it is possible to encode the numeric indicator of the identified GUI element's type using only four of the bits within a byte's sequence of eight bits (because four bits allows for 16 different values), which leaves the other four bits within a byte's sequence of eight bits available for encoding the indication of how many bytes utilized to encode certain pieces of information for the identified GUI element.

As one example of how the available bits of the byte encoding the numeric indicator of the identified GUI element's type could be used in this scenario, a first bit of those four available bits within the byte encoding the numeric indicator of the identified GUI element's type (e.g., a most significant bit) could be designated to serve as an indicator of how many bytes are utilized to encode a first piece of information for the identified GUI element (e.g., a horizontal coordinate), a second bit of those four available bits within the byte encoding the numeric indicator of the identified GUI element's type (e.g., a second-most significant bit) could be designated to serve as an indicator of how many bytes are utilized to encode a second piece of information for the identified GUI element (e.g., a vertical coordinate), a third bit of those four available bits within the byte encoding the numeric indicator of the identified GUI element's type (e.g., a third-most significant bit) could be designated to serve as an indicator of how many bytes are utilized to encode a third piece of information for the identified GUI element (e.g., a width), and a fourth bit of those four available bits within the byte encoding the numeric indicator of the identified GUI element's type (e.g., a fourth-most significant bit) could be designated to serve as an indicator of how many bytes are utilized to encode a fourth piece of information for the identified GUI element (e.g., a height), where a bit value of 0 indicates that one byte is utilized to encode the respective piece of information and a bit value of 1 indicates that two bytes are utilized to encode the respective piece of information (or vice versa). Other examples of how the available bits of the byte encoding the numeric indicator of the identified GUI element's type could be used in this scenario are possible as well.

Other scenarios where the indication of how many bytes are utilized to encode certain pieces of information for the identified GUI element is encoded in the same byte that is being utilized to encode some other piece of information for the identified GUI element may be possible as well.

Advantageously, by encoding the information for rendering a generic visual representation of an identified GUI element into a variable-length sequence of bytes that only includes as many bytes as is necessary to encode that particular information, the data size of the respective data structure for each identified GUI element may be optimized, and the overall data size of the generated dataset that encodes the generic visualization of the given client application's GUI state may be reduced. However, the manner in which the information for rendering a generic visual representation of an identified GUI element is encoded into a respective data structure for the identified GUI element may take various other forms as well. For instance, as one alternative implementation, the information for rendering a generic visual representation of an identified GUI element may be encoded into a data structure comprising a fixed-length sequence of bytes that includes, for each respective piece of information to be encoded, a fixed number of bytes that is defined based on a maximum number of bytes required to encode all possible values of the respective piece of information—such as one byte for a numeric indicator of type, two bytes for a horizontal coordinate, two bytes for a vertical coordinate, two bytes for a width, and two bytes for height—even though that maximum number of bytes will not always be required to encode the respective piece of information. This implementation may reduce the complexity of the encoding, because it may avoid the need to encode an indication of how of how many bytes are utilized to encode certain pieces of information for the identified GUI element, but it will also increase the overall data size of the generated dataset that encodes the generic visualization of the given client application's GUI relative to an implementation that utilizes variable-length sequences of bytes tailored to the particular information being encoded.

Further, the manner in which the respective data structures for the identified GUI elements may be combined together to produce the dataset that encodes the generic visualization of the given client application's GUI state may take various forms. For instance, as one possible implementation, the given client application running on the end-user client device 202A may combine the respective data structures for the identified GUI elements together into a concatenated sequence of data structures having an order that corresponds to a rendering order of the identified GUI elements, such that a respective data structure for an identified GUI element at a lowest layer of the GUI state is included as the first data structure in the concatenated sequence and a respective data structure for an identified GUI element at a highest layer of the GUI state is included as the last data structure in the concatenated sequence (or vice versa). In this respect, if the respective data structure for each identified GUI elements takes the form of either (i) a variable-length sequence of bytes that includes an indication of how many bytes are utilized to encode pieces of information that may occupy a variable number of bytes (and thus how many total bytes are included in the sequence) or (ii) a fixed-length sequence of bytes, then the boundaries between the respective data structures within the concatenated sequence can be identified by the back-end platform 204 based on the data structures alone and no other information needs to be added to the concatenated sequence of data structures. On the other, if the respective data structure for each identified GUI elements takes the form of a variable-length sequence of bytes (or some other variable-length data structure) that does not include any indication of how many bytes are included in the variable-length, then the concatenated sequence of data structures may additionally include delimiters that demarcate the boundaries between adjacent data structures within the concatenated sequence.

As another possible implementation, the given client application running on the end-user client device 202A may combine the respective data structures for the identified GUI elements together into some other type of data structure, such as a two-dimensional table (e.g., a flat file) in which the data records occupy rows that are sorted in an order that corresponds to a rendering order of the identified GUI elements.

The manner in which the respective data structures for the identified GUI elements may be combined together to produce the dataset that encodes the generic visualization of the given client application's GUI state may take other forms as well.

Figure 5A:
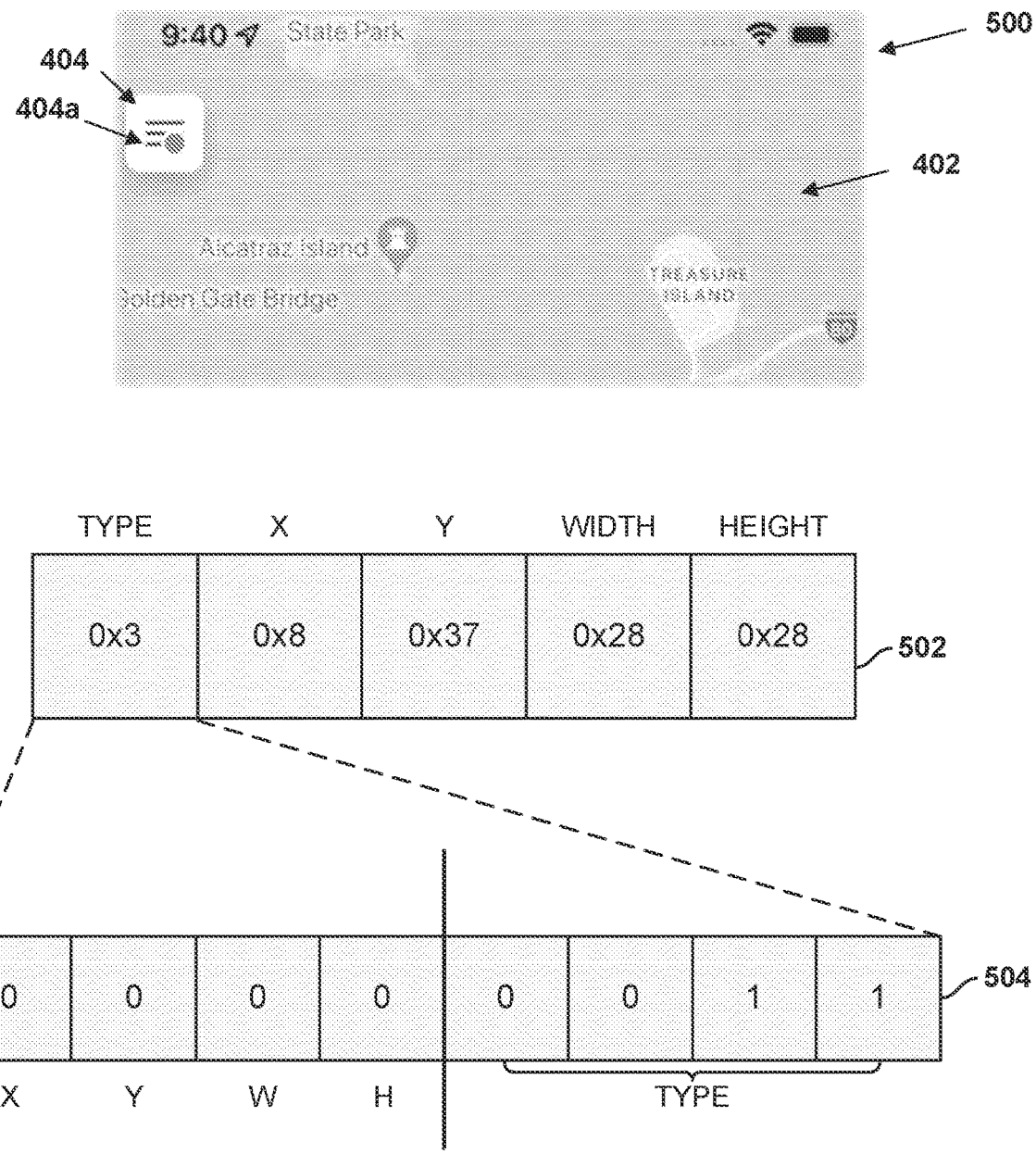
FIG. 5A is a diagram that illustrates one possible example of functionality for encoding information for rendering a generic visual representation of an identified GUI element into a respective data structure for the identified GUI element that may be carried out in accordance with the disclosed technology.

One possible example of the disclosed functionality for encoding information for rendering a generic visual representation of an identified GUI element into a respective data structure for the identified GUI element is illustrated in FIG. 5A. In FIG. 5A, a first portion 500 of the example GUI 400 is reproduced that includes a portion of the map element 402, the container element 404, and the selectable image 404a for accessing a menu near the top-left corner of the map element 402.

In the example of FIG. 5A, the container element 404 has been identified as a GUI element that is to be represented in a generic visualization of the GUI, and the container element 404 is determined to have the following example information for rendering a generic visual representation of the container element 404: (i) a type indicator of 3, which specifies a "container" type of GUI element, (ii) a horizontal coordinate of 8 according to a coordinate system for the example GUI 400 (e.g., a window coordinate system), (iii) a vertical coordinate of 55 according to the coordinate system for the example GUI 400, (iv) a width of 40 according to the coordinate system for the example GUI 400, and (v) a height of 40 according to the coordinate system for the example GUI 400.

Further, in the example of FIG. 5A, this example information for rendering a generic visual representation of the container element 404 is encoded into an example data structure 502 for the container element 404 that takes the form of a variable-length sequence of bytes in which the number of bytes utilized to encode the GUI element type is fixed at a single byte and the number of bytes utilized to encode each of the other attributes may vary between one byte or two bytes depending on the value of the attribute. In this example, because the values of the position and size attributes for the container element 404 are each less than 256, a single byte can be utilized to encode each of those attributes. Additionally, in this example, an indication of how many bytes are utilized to encode the position and size attributes for the container element 404 is encoded within the same byte that is utilized to encode the type indicator for the container element 404, which is made possible by the fact that there are only 16 or less total possible types of GUI elements that may be identified and encoded within the example data structure 502.

As a result, the example data structure 502 for the container element 404 is shown to include (i) a first byte that encodes both the indication of how many bytes are utilized to encode the position and size attributes and the type indicator of 3 for the container element 404 with a hexadecimal value of 0x3, (ii) a second byte that encodes the horizontal coordinate of 8 for the container element 404 with a hexadecimal value of 0x8, (iii) a third byte that encodes the vertical coordinate of 55 for the container element 404 with a hexadecimal value of 0x37, (iv) a fourth byte that encodes the width of 40 for the container element 404 with a hexadecimal value of 0x28, and (v) a fifth byte that encodes the height of 40 for the container element 404 with a hexadecimal value of 0x28.

Further, FIG. 5A depicts an expanded, bit-level view 504 of the example data structure's first byte that encodes the indication of how many bytes are utilized to encode the position and size attributes and the type indicator for the container element 404 in order to illustrate how that information is encoded together into a single byte. As shown by the expanded, bit-level view 504, the first four bits of this first byte (e.g., the four most-significant bits) encode the indication of how many bytes are utilized to encode the position and size attributes—where the first bit indicates how many bytes are utilized to encode the horizontal coordinate, the second bit indicates how many bytes are utilized to encode the vertical coordinate, the third bit encodes how many bytes are utilized to encode the width, and the fourth bit encodes how many bytes are utilized to encoded the height—and then the second four bits of the first byte (e.g., the four least-significant bits) may encode the type indicator of 3 for the container element 404. And in this example, each of the first four bits of the example data structure's first byte is shown to have a bit value of 0, which indicates that one byte is utilized to encode each of the horizontal coordinate, the vertical coordinate, the width, and the height of the container element 402.

Figure 5B:
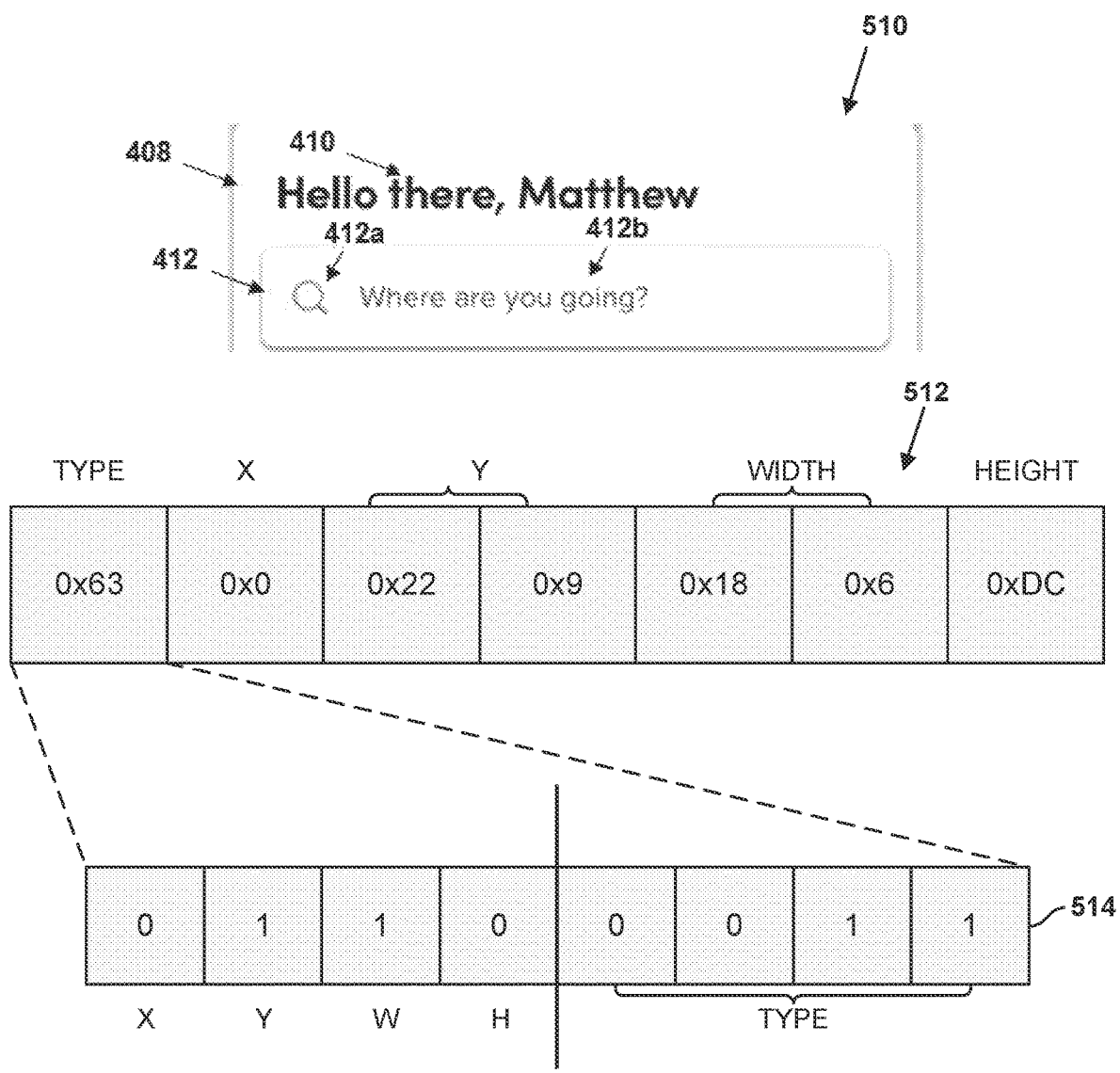
FIG. 5B is a diagram that illustrates another possible example of functionality for encoding information for rendering a generic visual representation of an identified GUI element into a respective data structure for the identified GUI element that may be carried out in accordance with the disclosed technology.

Another possible example of the disclosed functionality for encoding information for rendering a generic visual representation of an identified GUI element into a respective data structure for the identified GUI element is illustrated in FIG. 5B. In FIG. 5B, a second portion 510 of the example GUI 400 is reproduced that includes (i) a portion of the container element 408, (ii) the text element 410 comprising the text "Hello there, Matthew", (iii) the container element 412, (iv) the image element 412a comprising a magnifying glass, and (v) the text element 412b comprising the text "Where are you going?".

In the example of FIG. 5B, the container element 408 has been identified as a GUI element that is to be represented in a generic visualization of the GUI, and the container element 408 is determined to have the following example information for rendering a generic visual representation of the container element 408: (i) a type indicator of 3, which specifies a "container" type of GUI element, (ii) a horizontal coordinate of 0 according to a coordinate system for the example GUI 400 (e.g., a window coordinate system), (iii) a vertical coordinate of 553 according to the coordinate system for the example GUI 400, (iv) a width of 390 according to the coordinate system for the example GUI 400, and (v) a height of 220 according to the coordinate system for the example GUI 400.

Further, in the example of FIG. 5B, this example information for rendering a generic visual representation of the container element 408 is encoded into an example data structure 512 for the container element 408 that takes the form of a variable-length sequence of bytes in which the number of bytes utilized to encode the GUI element type is fixed at a single byte and the number of bytes utilized to encode each of the other attributes may vary between one byte or two bytes depending on the value of the attribute. In this example, a single byte is utilized to encode each of the horizontal coordinate and the height for the container element 408, because the value for each of those attributes is less than 256, while two bytes are utilized to encode each of the vertical coordinate and the width for the container element 408, because the value for each of those attributes is greater than 256, Additionally, in this example, an indication of how many bytes are utilized to encode the position and size attributes for the container element 404 is encoded within the same byte that is utilized to encode the type indicator for the container element 408, which is made possible by the fact that there are only 16 or less total possible types of GUI elements that may be identified and encoded within the example data structure 510.

As a result, the example data structure 510 for the container element 408 is shown to include (i) a first byte that encodes both the indication of how many bytes are utilized to encode the position and size attributes and the type indicator of 3 for the container element 408 with a hexadecimal value of 0x63, (ii) a second byte that encodes the horizontal coordinate of 0 for the container element 408 with a hexadecimal value of 0x0, (iii) third and fourth bytes that collectively encode the vertical coordinate of 553 for the container element 408 with respective hexadecimal values of 0x22 and 0x9 (which collectively form a 16-bit value that equates to 553), (iv) fifth and sixth bytes that collectively encode the width of 390 for the container element 408 with respective hexadecimal values of 0x18 and 0x6 (which collectively form a 16-bit value that equates to 390), and (v) a seventh byte that encodes the height of 220 for the container element 408 with a hexadecimal value of 0xDC.

Further, FIG. 5B depicts an expanded, bit-level view 514 of the example data structure's first byte that encodes the indication of how many bytes are utilized to encode the position and size attributes and the type indicator for the container element 408 in order to illustrate how that information is encoded together into a single byte. As shown by the expanded, bit-level view 514, the first four bits of this first byte (e.g., the four most-significant bits) encode the indication of how many bytes are utilized to encode the position and size attributes—where the first bit indicates how many bytes are utilized to encode the horizontal coordinate, the second bit indicates how many bytes are utilized to encode the vertical coordinate, the third bit encodes how many bytes are utilized to encode the width, and the fourth bit encodes how many bytes are utilized to encoded the height—and then the second four bits of the first byte (e.g., the four least-significant bits) may encode the type indicator of 3 for the container element 408. In this example, the first bit and the fourth bit are each shown to have values of 0, indicating that one byte is utilized to encode each of the horizontal coordinate and the height of the container element 408, and the second bit and third bit are each shown to have values of 1, indicating that two bytes are utilized to encode each of the vertical coordinate and the width of the container element 408.

Turning now to FIG. 5C, one possible example of how the respective data structures for the identified GUI elements within the example GUI 400 of FIG. 4A may be combined together to produce an example dataset 520 that encodes the generic visualization of the example GUI 400 is illustrated. In the example of FIG. 5C, the example dataset 520 is shown to take the form of a concatenated sequence of respective data structures for the identified GUI elements within the example GUI 400 of FIG. 4A that are arranged in an order that corresponds to a rendering order of the identified GUI elements, such that a respective data structure for an identified GUI element at a lowest layer of the example GUI 400 is included as the first data structure in the concatenated sequence and a respective data structure for an identified GUI element at a highest layer of the example GUI 400 is included as the last data structure in the concatenated sequence. In particular, the example dataset 520 comprises is shown to include the following sequence of data structures from left to right: (i) a first data structure for the map element 402, (ii) a second data structure for the container element 404, (iii) a third data structure for the image element 406, and (iv) a fourth data structure for the container element 408, (v) a fifth data structure for the selectable image icon 404a, (vi) a sixth data structure for the text element 410, (vii) a seventh data structure for the container element 412, (viii) an eight data structure for the image element 414a, (ix) a ninth data structure for the text element 414b, (x) a tenth data structure for the text element 414c, (xi) an eleventh data structure for the toolbar element 416, (xii) a twelfth data structure for the text popup element 418, and so on for the other identified GUI elements at the higher layers of the example GUI 400. However, it should be understood that the respective data structures for the identified GUI elements within the example GUI 400 may be combined together and/or arranged in various other manners as well in order to produce the dataset that encodes the generic visualization of the example GUI 400.

Turning now to block 312 of FIG. 3, after generating the dataset that encodes the generic visualization of the given client application's GUI state at the first time, the given client application running on the end-user client device 202A may store the generated dataset by writing it to local data storage of the end-user client device 202A. In practice, the generated dataset may be written to the end-user client device's local data storage utilizing any of various storage architectures, examples of which may include one or more volatile storage structures that are allocated within the random access memory (RAM) of the end-user client device 202A (e.g., one or more RAM-based buffers and/or RAM-based linked lists), one or more non-volatile storage structures that are allocated within the disk storage of the end-user client device 202A (e.g., disk-based buffers, disk-based databases, disk-based file stores, and/or disk-based object stores), or some combination thereof.

After generating and storing the dataset that encodes the generic visualization of the given client application's GUI state at the first time when the first trigger occurrence was detected, the given client application running on the end-user client device 202A may then return to block 304 and continue monitoring for subsequent trigger occurrences that, if detected, are to cause the given client application to encode generic visualizations of the given client application's GUI states at other times during the given runtime session. Thereafter, the given client application running on the end-user client device 202A may repeat blocks 306-312 one or more additional times during the given runtime session, which may result in the given client application generating and storing datasets that encode generic visualizations of the given client application's GUI state at multiple different times during the course of the given runtime session.

At block 314, at some point after generating and storing the dataset that encodes the generic visualization of the given client application's GUI state at the first time when the first trigger occurrence was detected, the given client application running on the end-user client device 202A may report that dataset to the back-end platform 204. In this respect, the given client application may report the dataset that encodes the generic visualization of the given client application's GUI state at the first time to the back-end platform 204 together with other information about the given runtime session of the given client application, such as other datasets that encode generic visualizations of the given client application's GUI state at other times during the given runtime session when other trigger occurrences were detected, log information for the given runtime session (e.g., a set of log entries), other types of contextual information for the given runtime session (e.g., state information for the given client application and/or the end-user client device 202A running the given client application that was captured during the given runtime session), and/or session details for the given runtime session, among other possibilities.

This reporting function may take various forms, and in at least some implementations, may involve (i) retrieving a particular set of information for the given runtime session that is to be reported to the back-end platform 204 from the local data storage of the end-user client device 202A, where such information includes the dataset that encodes the generic visualization of the given client application's GUI state at the first time, (ii) preparing the retrieved set of information for transmission to the back-end platform 204 (e.g., by packaging it up into a message structure that is readable by the back-end platform 204), and then (iii) causing the retrieved set of information for the given runtime session to be transmitted over the respective communication path between the end-user client device 202A and the back-end platform 104, which as noted above may include one or more data networks and/or data links.

Further, in practice, the given client application may report the set of information for the given runtime session of the given client application (which includes the dataset that encodes the generic visualization of the given client application's GUI state at the first time) to the back-end platform 204 at any of various times. For instance, in one implementation, the given client application may be configured to report the set of information for the given runtime session of the given client application to the back-end platform 104 at the time that the given runtime session concludes (e.g., in response to determining that the given runtime session has been terminated). In another implementation, the given client application may be configured such that, if the given runtime session concludes at a time when the end-user client device 202A is only connected to a cellular network and not a Wi-Fi network, the given client application may wait to report the set of information for the given runtime session to the back-end platform 204 until the end-user client device 202A re-connects to a Wi-Fi network in order to avoid utilizing cellular data to transmit the set of information for the given runtime session—which could result in the end-user client device 202A sending respective sets of information for multiple runtime sessions of the given client application that have taken place since the end-user client device's last connection to a Wi-Fi network. The given client application may report the set of information for the given runtime session of the given client application to the back-end platform 204 at other times as well.

The function of reporting the dataset that encodes the generic visualization of the given client application's GUI state at the first time may take other forms as well—including but not limited to the possibility that the datasets encoding the generic visualizations of the given client application's GUI may be reported separately from other types of information for the given runtime session.

While the foregoing functionality is described with reference to one particular runtime session of the given client application, it should also be understood that the given client application may be configured to carry out this functionality during any runtime session of the given client application so as to enable generic visualizations of the given client application's GUI to be encoded and then later reproduced by the back-end platform 204 for any such runtime session.

In at least some implementations, in addition to encoding generic visualizations of the given client application's GUI in the manner described above, the given client application may also be programmed with the capability to encode visual representations of end-user interactions with the given client application's GUI. For instance, in response to detecting a given end-user interaction with the given client application's GUI at a given time, the given client application may function to (i) determine information for rendering a visual representation of the given end-user interaction with the given client application's GUI at the given time, such as a type of the given end-user interaction (e.g., a short press, long press, scroll up, scroll down, etc.) and a position of the given end-user interaction within the GUI (e.g., a horizontal and vertical coordinate according to a coordinate system for the GUI), and then (ii) encode the information for rendering the visual representation of the given end-user interaction into a respective data structure for the given end-user interaction, which may take a form of a variable-length sequence of bytes, a fixed-length sequence of bytes, or some other type of data structure. Thereafter, the given client application may report the generated dataset that encodes the visual representation of the given end-user interaction to the back-end platform 204—perhaps along with other information about the runtime session such as datasets for other end-user interactions, datasets encoding the generic visualizations of the given client application's GUI, and/or log information—and the back-end platform 204 can then utilize that dataset to reproduce the visual representation of the of the end-user interaction from the given time and cause it to be presented to individuals that are evaluating the runtime session of the client application.

Figure 6:
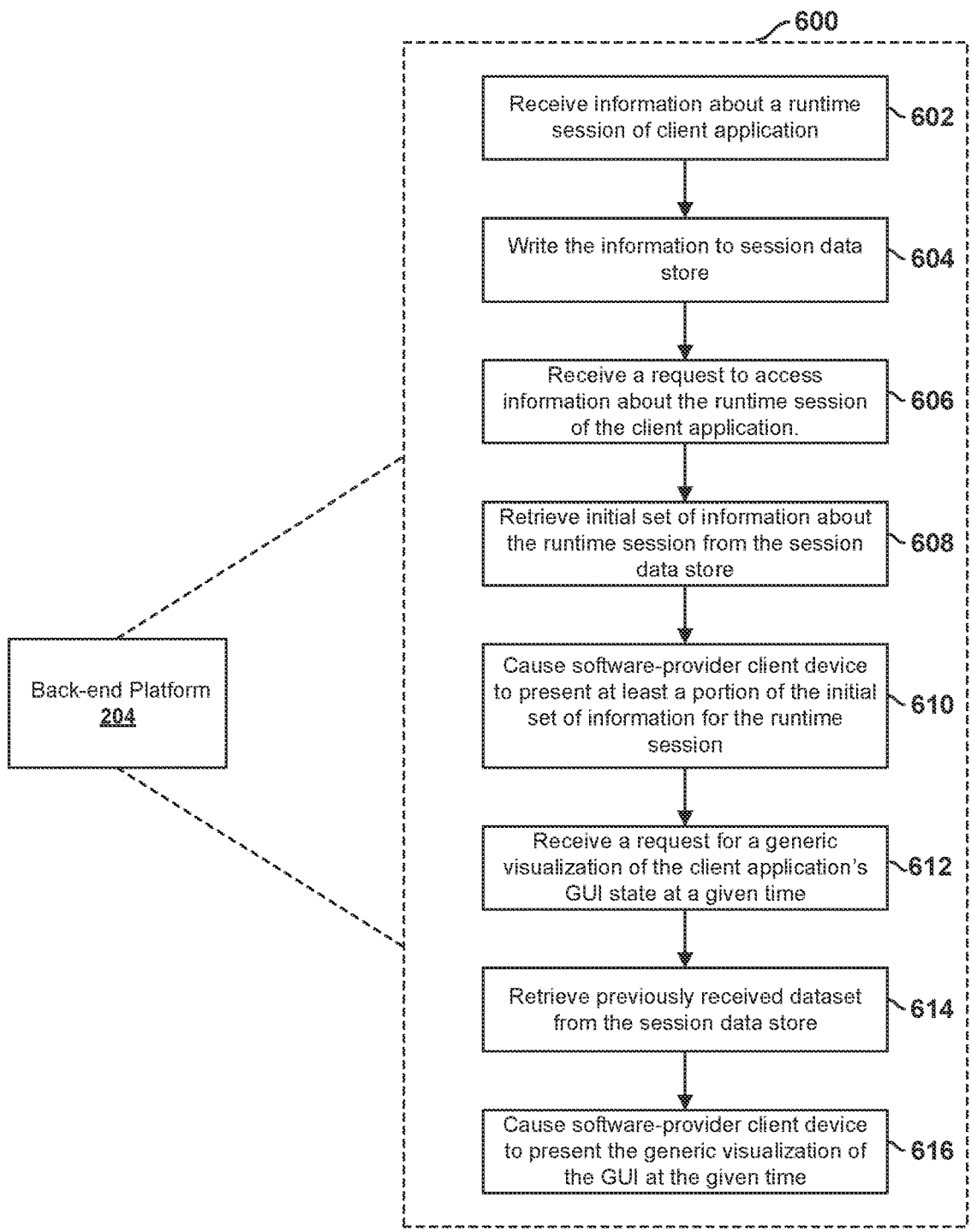
FIG. 6 is a flow diagram that illustrates some example operations that may be carried out by an example back-end platform in accordance with the present disclosure.

Turning now to FIG. 6, a flow diagram 600 is provided to show some example operations that may be carried out by a back-end platform in accordance with the present disclosure. For purposes of illustration only, the operations are described as being carried out by the example back-end platform 204 of FIG. 2, which as noted above may be operated by a software provider of the given client application installed on the end-user client devices 202A-C. It should be understood, however, that this functionality may be carried out by any computing system that incorporates the disclosed technology for reproducing generic visualizations of a client application's GUI based on datasets that encode such generic visualizations.

To begin, at block 602, the back-end platform 204 may receive information about a runtime session of the given client application installed on an end-user client device, such as the end-user client device 202A, where that information about the given runtime session includes a batch of "generic-visualization datasets" that each encodes a generic visualization of the given client application's GUI state at a respective time during the runtime session. For instance, as a result of the end-user client device 202A reporting information about the given runtime of the given client application comprising a batch of generic-visualization datasets that each encodes a generic visualization of the given client application's GUI state at a respective time during the given runtime session at block 314 of FIG. 3, the back-end platform 204 may receive the batch of generic-visualization datasets at block 602 (perhaps along with log information, other contextual information, session details, etc.). In practice, this function of receiving the information about the given runtime session of the given client application that includes the batch of generic-visualization datasets for the given runtime session may be handled by the integration pipeline 206 of the back-end platform 204, among other possibilities.

After receiving the batch of generic-visualization datasets for the given runtime session of the given client application on the end-user client device 202A, the integration pipeline 206 may perform certain pre-processing operations on the received batch of generic-visualization datasets (and any other accompanying information about the given runtime session), including but not limited to operations such as validation, cleansing, deduplication, filtering, aggregation, summarization, enrichment, restructuring, reformatting, translation, and/or mapping, among others.

At block 604, the back-end platform 204 may then write the received batch of generic-visualization datasets for the given runtime session of the given client application on the end-user client device 202A to the session data store 208, so that the generic-visualization datasets for the given runtime session may be available for future retrieval and use by the session analysis service 210 and perhaps also other functional systems of the back-end platform back-end platform 204. Additionally, to the extent that the batch of generic-visualization datasets for the given runtime session is received together with other types of information about the given runtime session (e.g., log information, other contextual information, session details, etc.), the back-end platform 204 may also write that other information about the given runtime session of the given client application to the session data store 208 as well.

After the received information about the given runtime session of the given client application on the end-user client device 202A has been written to the session data store 208, a user associated with the software provider (e.g., a developer, engineer, analyst, or the like) may be able to access and view information about the given runtime session in order to facilitate the user's analysis of the given runtime session. For instance, when a user associated with the software provider wishes to perform an analysis of the given runtime session of the given client application, the user may begin by launching a session analysis tool on a given software-provider client device 212 such as the software-provider client device 212A, which may cause the software-provider client device 212A to begin running client-side software for the launched session analysis tool. In practice, this client-side software for the session analysis tool may take the form of a mobile application, a web application, or a desktop application, among other possibilities, and may comprise a user interface that enables the user to view information about runtime sessions of the given client application.

While running client-side software for the launched session analysis tool, the software-provider client device 212A may then receive user input comprising a request by the user to view information about the given runtime session. This user input may take various forms, examples of which may include a user input of a Session ID for the given runtime session or a user selection of the given runtime session from a displayed list of available runtime sessions of the given client applications, among other possibilities.

After receiving the user input comprising a request by the user to view information about the given runtime session, the software-provider client device 212A may transmit a request to the session analysis service 210 to access information about the given runtime session of the given client application on the end-user client device 202A that is to be presented to the user of the software-provider client device 212A for review and analysis.

At block 606 of FIG. 6, the back-end platform 204 may then receive this request to access information about the given runtime session of the given client application on the end-user client device 202A. In practice, this request may take the form of one or more request messages (e.g., one or more HTTP messages) that are sent over the respective communication path between the software-provider client device 212A and the back-end platform 204, and in at least some implementations, the one or more request messages may be sent via an Application Programming Interface (API). However, the software-provider client device's request may take other forms as well. Further, the request to access information about the given runtime session of the given client application on the end-user client device 202A may take various forms, and in at least some implementations, may include identifying information for the given runtime session of the given client application (e.g., a client device ID, an application ID, a session ID, etc.).

In turn, at block 608, the back-end platform 204 (and in particular the session analysis service 210) may retrieve an initial set of information about the given runtime session of the given client application from the session data store 208, which may include session details, an initial set of log information, and perhaps also an initial set of contextual information. To accomplish this, the session analysis service 210 may utilize the identifying information for the given runtime session of the given client application that is included in the received request to locate the initial set of information for the given runtime session of the given client application that is stored within the session data store 208.

Then, at block 610, the back-end platform 204 (and in particular the session analysis service 210) may cause the software-provider client device 212A to present at least a portion of the initial set of information for the given runtime session of the given client application. To accomplish this, the session analysis service 210 may transmit a response to the software-provider client device 212A that comprises instructions and data for constructing a GUI for the session analysis tool that presents at least a portion of the initial set of information for the given runtime session of the given client application. In practice, this response may take the form of one or more response messages (e.g., one or more HTTP messages) that are sent over the respective communication path between the back-end platform 204 and the software-provider client device 212A, and in at least some implementations, the one or more response messages may be sent via an API. However, the session analysis service's response may take other forms as well. Further, the GUI for the session analysis tool that presents the initial set of information about the given runtime session of the given client application may take any of various forms.

While the software-provider client device 212A is presenting the initial set of information for the given runtime session of the given client application on the end-user client device 202A, the user of the software-provider client device 212A may also interact with the GUI in a manner that causes the software-provider client device 212A to request additional information about the given runtime session of the given client application for presentation to the user. For instance, in accordance with the present disclosure, the user may access a portion of the GUI for the session analysis tool where the user can review a generic visualization of the given client application's GUI state at a given time during the given runtime session of the given client application, such as by selecting a given point in time within the given runtime session or selecting a given log entry for which to review additional details, among other possibilities.

After receiving the user input comprising a request by the user to review the generic visualization of the given client application's GUI state at the given time during the given runtime session of the given client application, the software-provider client device 212A may transmit a request to the session analysis service 210 for the generic visualization of the given client application's GUI state at the given time, and then at block 612, the back-end platform 204 may receive the request for the generic visualization of the given client application's GUI state at the given time during the given runtime session. In practice, this request may take the form of one or more request messages (e.g., one or more HTTP messages) that are sent over the respective communication path between the software-provider client device 212A and the back-end platform 204, and in at least some implementations, the one or more request messages may be sent via an API. However, the received request may take other forms as well.

Further, the request for the generic visualization of the given client application's GUI state at the given time may take various forms, and in at least some implementations may include (i) identifying information for the given runtime session of the given client application (e.g., a client device ID, an application ID, a session ID, etc.) and (ii) an indication of the given time during the runtime session for which the generic visualization of the given client application's GUI state is being request (e.g., a timestamp and/or a log entry ID).

In turn, at block 614, the back-end platform 204 (and in particular the session analysis service 210) may retrieve the previously-received dataset that encodes the generic visualization of the given client application's GUI state at the given time from the session data store 208 (perhaps along with the corresponding information about the given runtime session). To accomplish this, the session analysis service 208 may utilize the identifying information for the given runtime session of the given client application and the indication of the given time that is included in the received request to locate the dataset within the session data store 208.

Then, at block 616, the back-end platform 204 (and in particular the session analysis service 210) may cause the software-provider client device 212A to present the generic visualization of the given client application's GUI state at the given time during the given runtime session. To accomplish this, the session analysis service 210 may (i) translate the retrieved dataset into a set of instructions and/or data for constructing the generic visualization of the given client application's GUI state at the given time during the given runtime session, and then (ii) transmit the set of instructions and/or data to the software-provider client device 212A over the respective communication path between the back-end platform 204 and the software-provider client device 212A (e.g., via an API).

The function of translating the retrieved dataset into the set of instructions and/or data for constructing the generic visualization of the given client application's GUI state at the given time during the given runtime session may take various forms, and in at least some implementations, may involve (i) parsing the retrieved dataset into the respective data structures for the GUI elements to be represented in the generic visualization, (ii) for each GUI element to be represented in the generic visualization, extracting the information that is encoded into the GUI element's respective data structure, and (iii) using the extracted information for the GUI elements to generate the set of instructions and/or data for constructing the generic visualization of the given client application's GUI state at the given time during the given runtime session.

In these implementations, the function of parsing the retrieved dataset into the respective data structures for the GUI elements to be represented in the generic visualization may take any of various forms, which may depend at least in part on the form of retrieved dataset that encodes the generic visualization. For example, in a scenario where the retrieved dataset takes the form of a concatenated sequence of data structures for the GUI elements that each comprise a variable-length sequence of bytes that includes an indication of how many bytes are utilized to encode pieces of information that may occupy a variable number of bytes (and thus how many total bytes are included in the sequence), the function of parsing the retrieved dataset into the respective data structures for the GUI elements to be represented in the generic visualization may start with the first byte in the concatenated sequence (e.g., the leftmost byte) and perform the following operations: (i) extract the indication of how many bytes are utilized to encode the other pieces of information within the first data structure, (ii) based on the extracted indication, determining a number of additional bytes that are included in the first data structure, and then (iii) identifying and parsing the sequence of bytes spanning from the first byte to the byte that is the determined number to the right of the first byte (e.g., if the determined number of additional bytes is four bytes, then the fifth byte in the concatenated sequence) as the first data structure for the first GUI element to be represented in the generic visualization. In turn, the parsing function may proceed to the next byte in the concatenated sequence after the first data structure—which is to include the indication of how many bytes are utilized to encode the other pieces of information within the second data structure—and repeat these operations in order to identify and parse the second data structure for the second GUI element. Along similar lines, the parsing function may then continue to progress through the remaining bytes within the concatenated sequence until the respective data structures for all of the GUI elements are identified and parsed.

As another example, in a scenario where the retrieved dataset takes the form of a concatenated sequence of data structures for the GUI elements that each comprise a fixed-length sequence of bytes, the function of parsing the retrieved dataset into the respective data structures for the GUI elements to be represented in the generic visualization may involve using the fixed length of the sequences of bytes to identify the boundaries between the respective data structures and then using the identified boundaries to parse the concatenated sequence into the respective data structures for the GUI elements.

As yet another example, in a scenario where the retrieved dataset takes the form of a concatenated sequence of data structures for the GUI elements that includes delimiters for demarcating the boundaries between adjacent data structures within the concatenated sequence, the function of parsing the retrieved dataset into the respective data structures for the GUI elements to be represented in the generic visualization may involve using the delimiters to identify the boundaries between the respective data structures and then using the identified boundaries to parse the concatenated sequence into the respective data structures for the GUI elements.

The function of parsing the retrieved dataset into the respective data structures for the GUI elements to be represented in the generic visualization may take other forms as well.

Further, the function of extracting the information that is encoded into each GUI element's respective data structure may take any of various forms, which may also depend at least in part on the form of the respective data structures that encode the information for the GUI elements. For example, in a scenario where the respective data structures that encode the information for the GUI elements each comprise a variable-length sequence of bytes that includes an indication of how many bytes are utilized to encode pieces of information that may occupy a variable number of bytes, the function of extracting the information that is encoded into each GUI element's respective data structure may involve (i) utilizing a predefined encoding format and the indication of how many bytes are utilized to encode pieces of information that may occupy a variable number of bytes to determine which pieces of information for the GUI element are encoded into which bytes of the GUI element's respective data structure and (ii) translating each piece of information's one or more bytes into a corresponding value that can be utilized to render a generic visual representation of the GUI element, such as a type value, a horizontal coordinate value, a vertical coordinate value, a width value, or a height value.

As another example, in a scenario where the retrieved dataset takes the form of a concatenated sequence of data structures for the GUI elements that each comprise a fixed-length sequence of bytes, the function of extracting the information that is encoded into each GUI element's respective data structure may involve (i) utilizing a predefined encoding format to determine which pieces of information for the GUI element are encoded into which bytes of the GUI element's respective data structure and (ii) translating each piece of information's one or more bytes into a corresponding value that can be utilized to render a generic visual representation of the GUI element.

As yet another example, in a scenario where the retrieved dataset takes the form of a concatenated sequence of data structures for the GUI elements that includes delimiters for demarcating the boundaries between adjacent data structures within the concatenated sequence, the function of extracting the information that is encoded into each GUI element's respective data structure may involve (i) utilizing a predefined encoding format and the delimiters to determine which pieces of information for the GUI element are encoded into which bytes of the GUI element's respective data structure and (ii) translating each piece of information's one or more bytes into a corresponding value that can be utilized to render a generic visual representation of the GUI element.

The function of extracting the information that is encoded into each GUI element's respective data structure may take other forms as well.

Further yet, the function of using the extracted information for the GUI elements to generate the set of instructions and/or data for constructing the generic visualization of the given client application's GUI state at the given time during the given runtime session may take various forms. For instance, as one possibility, this function may involve (i) using the extracted information for the GUI elements to define the appearance of the generic visualization of the given client application's GUI state, and then (ii) generating a set of instructions and/or data for constructing a generic visualization having the defined appearance. In this respect, the appearance of the generic visualization of the given client application's GUI state may be defined to include, for each identified GUI element, a generic representation of the GUI element having (i) a visual appearance that corresponds to the GUI element's type and (ii) a position and size within the generic visualization that corresponds to the GUI element's position and size within the GUI state. Further, the appearance of the generic visual representations that are utilized for the different types of GUI elements may take any of various forms, and as some representative examples, a container element may be represented by a rectangle having a black border and no fill, an image element may be represented by generic image icon, a text element may be represented by a shaded rectangle, and a map element may be represented by a generic map icon, among various other possible examples.

The function of causing the software-provider client device 212A to present the generic visualization of the given client application's GUI state at the given time during the given runtime session may take other forms as well. For instance, as one alternate implementation, the session analysis service 210 may function to transmit the retrieved dataset to the software-provider client device 212A and the software-provider client device 212A without performing any translation (or other processing) on the retrieved dataset, and the client-side software of the session analysis tool running on the software-provider client device 212A may then function to translate the retrieved dataset into a set of instructions and/or data for rendering the generic visualization of the given client application's GUI state by carrying out functionality similar to that described above (e.g., by parsing the retrieved dataset into the respective data structures for the GUI elements to be represented in the generic visualization, extracting the information that is encoded into each GUI element's respective data structure, etc.).

While the functionality of blocks 612-616 has been described above with respect to a generic visualization of the given client application's GUI state at a single given time, it should be understood that this functionality may be performed multiple times in order to cause the software-provider client device 212A to present generic visualizations of the given client application's GUI state at various times during the course of the given runtime session. Further, while the implementation described above is one in which the request for a generic visualization of the given client application's GUI state is sent separately from the initial request to access the initial set of information for the given runtime session, in other implementations, it is possible that the initial request may trigger the back-end platform 204 to carry out the functionality of blocks 614-616 for an initial set of one or more generic visualization of the given client application's GUI state.

Figure 7:
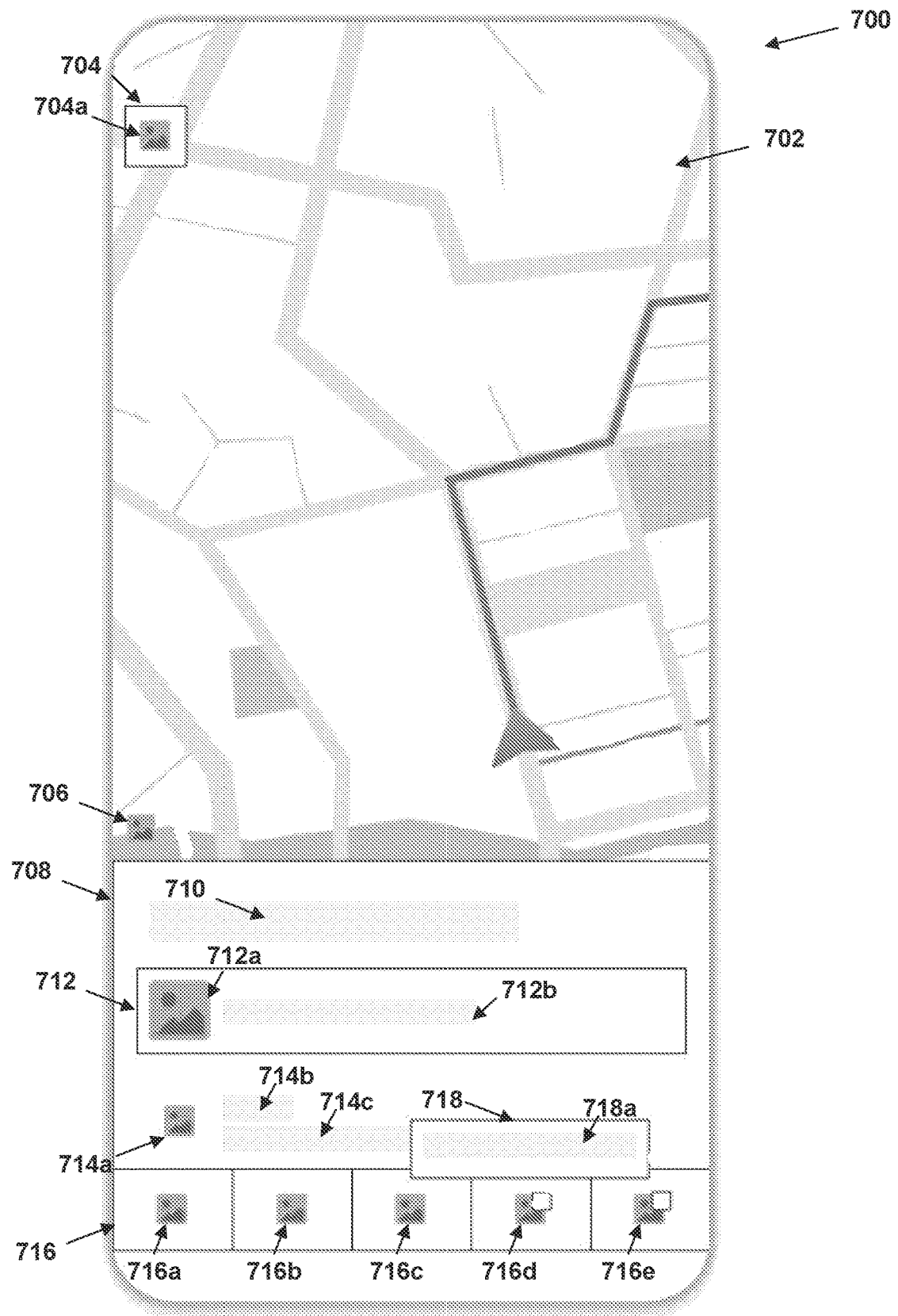
FIG. 7 is a diagram that illustrates one illustrative example of a generic visualization of the example GUI of FIG. 4A that may be reproduced and presented by a back-end platform in accordance with the disclosed technology.

FIG. 7 shows one illustrative example of a generic visualization 700 of the example GUI 400 of FIG. 4A that may be reproduced and presented by the back-end platform 204 in accordance with the disclosed technology.

The generic visualization 700 includes generic visual representations of the various GUI elements of the example GUI 400, wherein each generic visual representation may have (i) a visual appearance that corresponds to its corresponding GUI element's type and (ii) a position and size within the generic visualization 700 that corresponds to its position and size within the example GUI 400. For example, a container element may be represented by a rectangle having a black border and no fill, an image element may be represented by generic image icon, a text element may be represented by a shaded rectangle, and a map element may be represented by a generic map icon, among various other possible examples.

For instance, as shown, the lowers visible layer of the example generic visualization 700 comprises a generic map representation 702. In turn, the example generic visualization 700 includes several additional layers overlaid on top of the generic map representation 702. For example, the generic map representation 702 is overlaid with a generic container representation 704 that contains a generic image representation 704a. As another example, the generic map representation 702 is overlaid with a generic image representation 706 near the bottom-left corner of the visible portion of the generic map representation 702. As yet another example, the generic map representation 702 is overlaid with a generic container representation 708 on the bottom-third portion of the generic map representation 702, which is in turn overlaid with various other generic visual representations. For instance, moving from top to bottom, the generic container representation 708 is overlaid with (i) a generic text representation 710, (ii) a generic container representation 712 that contains a generic image representation 712a as well a generic text representation 712b, (iii) a generic image representation 714a and adjacent generic text representations 714b and 714c, and (iv) a generic toolbar representation 716 comprising five generic image representations 716a-716e, each of which resides within a respective generic container representation that is not visually delineated within the example generic visualization 700. Lastly, the generic image representations 416d and 416e are each shown to have an additional generic image representation overlaid on top of them, and a generic popup representation 718 containing a generic text representation 718a is overlaying portions of the generic text representation 714c and the generic toolbar representation 716.

Figure 8:
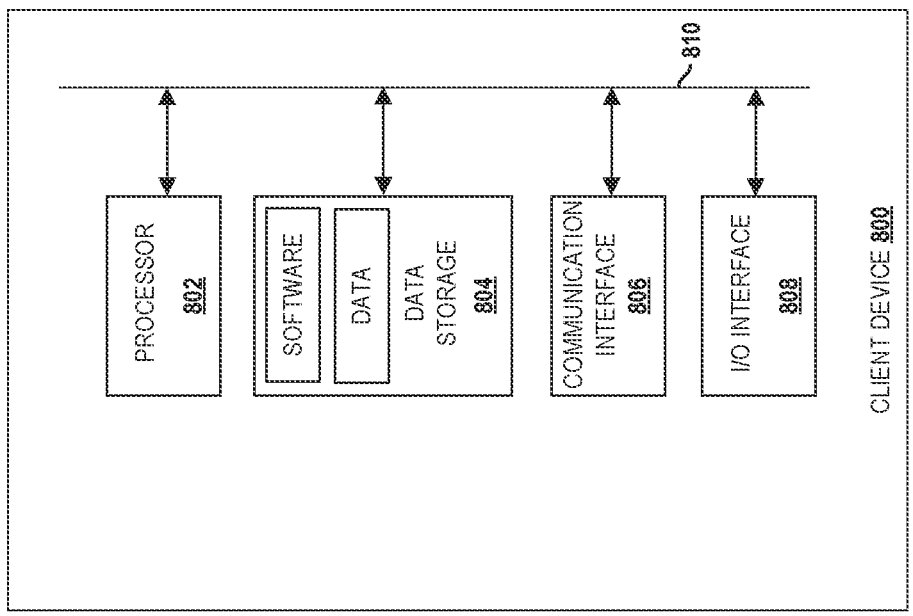
FIG. 8 is a simplified block diagram that illustrates some structural components that may be included in an example client device that may be configured to carry out any of the various functions disclosed herein.

Turning now to FIG. 8, a simplified block diagram is provided to illustrate some structural components that may be included in an example client device 800, which may be configured to carry out any of the various functions disclosed herein. At a high level, client device 800 may include one or more processors 802, data storage 804, one or more communication interfaces 806, and an input/output (I/O) interface 808, all of which may be communicatively linked by a communication link 810 that may that various forms, one example of which is a system bus.

The one or more processors 802 of client device 800 may comprise one or more processor components, each of which may take the form of a general-purpose processor (e.g., a microprocessor), a special-purpose processor (e.g., an application-specific integrated circuit, a digital signal processor, a graphics processing unit, a vision processing unit, etc.), a programmable logic device (e.g., a field-programmable gate array), or a controller (e.g., a microcontroller), among other possibilities.

In turn, data storage 804 of client device 800 may comprise one or more non-transitory computer-readable mediums, each of which may take the form of a volatile medium (e.g., random-access memory, a register, a cache, a buffer, etc.) or a non-volatile medium (e.g., read-only memory, a hard-disk drive, a solid-state drive, flash memory, an optical disk, etc.), and these one or more non-transitory computer-readable mediums may be capable of storing both (i) program instructions that are executable by the one or more processors 802 of the client device 800 such that the client device 800 is configured to perform any of the various client-device functions disclosed herein (e.g., the functionality described above with reference to the end-user client device 202A and/or the software-provider client device 212A), and (ii) data related to the disclosed client-device functionality.

The one or more communication interfaces 808 of client device 800 may take the form of any one or more interfaces that facilitate wireless and/or wired communication with other computing devices or systems, including but not limited to the back-end platform 204 of FIG. 1. Each such communication interface 808 may take any of various forms, examples of which may include an Ethernet interface, a serial bus interface (e.g., Firewire, USB 3.0, etc.), a chipset and antenna adapted to facilitate any of various types of wireless communication (e.g., Wi-Fi communication, cellular communication, short-range wireless protocols, etc.), and/or any other interface that provides for wireless or wired communication. Other configurations are possible as well.

The I/O interface 808 may generally take the form of (i) one or more input interfaces that are configured to receive and/or capture information at the client device 800 and (ii) one or more output interfaces that are configured to output information from client device 800 (e.g., for presentation to a user). In this respect, the one or more input interfaces of I/O interface 808 may include or provide connectivity to input components such as a microphone, a camera, a keyboard, a mouse, a trackpad, a touchscreen, and/or a stylus, among other possibilities. In turn, the one or more output interfaces of I/O interface 808 may include or provide connectivity to output components such as a display screen and/or an audio speaker, among other possibilities.

It should be understood that the client device 800 is one example of a client device that may be used with the example embodiments described herein. Numerous other arrangements are possible and contemplated herein. For instance, in other embodiments, the client device 800 may include additional components not pictured and/or more or fewer of the pictured components.

Turning now to FIG. 9, a simplified block diagram is provided to illustrate some structural components that may be included in an example back-end platform 900, which may be configured to carry out any of the various functions disclosed herein. At a high level, back-end platform 900 may generally comprise any one or more computing systems that collectively include one or more processors 902, data storage 904, and one or more communication interfaces 906, all of which may be communicatively linked by a communication link 908 that may take the form of a system bus, a communication network such as a public, private, or hybrid cloud, or some other connection mechanism. Each of these components may take various forms.

The one or more processors 902 may comprise one or more processor components, each of which may take the form of a general-purpose processor (e.g., a microprocessor), a special-purpose processor (e.g., an application-specific integrated circuit, a digital signal processor, a graphics processing unit, a vision processing unit, etc.), a programmable logic device (e.g., a field-programmable gate array), or a controller (e.g., a microcontroller), among other possibilities. In line with the discussion above, it should also be understood that the one or more processors 902 could comprise processing components that are distributed across a plurality of physical computing systems connected via a network, such as a computing cluster of a public, private, or hybrid cloud.

In turn, the data storage 904 may comprise one or more non-transitory computer-readable storage mediums, each of which may take the form of a volatile medium (e.g., random-access memory, a register, a cache, a buffer, etc.) or a non-volatile medium (e.g., read-only memory, a hard-disk drive, a solid-state drive, flash memory, an optical disk, etc.), and these one or more non-transitory computer-readable mediums may be capable of storing both (i) program instructions that are executable by the one or more processors 902 such that the back-end platform 900 is configured to perform any of the various back-end platform functions disclosed herein, and (ii) data related to the disclosed back-end platform functionality. In line with the discussion above, it should also be understood that the data storage 904 may comprise computer-readable storage mediums that are distributed across a plurality of physical computing systems connected via a network, such as a storage cluster of a public, private, or hybrid cloud that operates according to technologies such as AWS for Elastic Compute Cloud, Simple Storage Service, etc.

The one or more communication interface 906 may take the form of any one or more interfaces that facilitate wireless and/or wired communication with other computing devices or systems, including but not limited to the client devices 202 and 212 of FIG. 2. Each such communication interface 908 may take any of various forms, examples of which may include an Ethernet interface, a serial bus interface (e.g., Firewire, USB 3.0, etc.), a chipset and antenna adapted to facilitate any of various types of wireless communication (e.g., Wi-Fi communication, cellular communication, short-range wireless protocols, etc.), and/or any other interface that provides for wireless or wired communication. Other configurations are possible as well.

Although not shown, the back-end platform 900 may additionally include an I/O interface that facilitates user interaction with the back-end platform 900.

It should be understood that the back-end platform 900 is one example of a back-end platform that may be used with the embodiments described herein. Numerous other arrangements are possible and contemplated herein. For instance, other back-end platforms may include additional components not pictured and/or more or less of the pictured components.

CONCLUSION

This disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners without departing from the true scope and sprit of the present invention, which will be defined by the claims.

Further, to the extent that examples described herein involve operations performed or initiated by actors, such as "humans," "curators," "users" or other entities, this is for purposes of example and explanation only. The claims should not be construed as requiring action by such actors unless explicitly recited in the claim language.

We claim:

1. A method implemented by a client device installed with a client application having a graphical user interface (GUI), the method comprising:
    during a runtime session of the client application, presenting the GUI of the client application to an end user of the client device;
    while presenting the GUI of the client application to the end user of the client device during the runtime session, identifying a set of GUI elements within the presented GUI of the client application that is to be represented in a generic visualization of the presented GUI;
    for each GUI element in the identified set:
        determining a respective type of the GUI element, a respective position of the GUI element, and a respective size of the GUI element; and
        generating a respective variable-length sequence of bytes that encodes information for use in rendering a respective generic representation of the GUI element in place of a presented representation of the GUI element, wherein the encoded information includes the respective type, the respective position, and the respective size of the GUI element, wherein a variable number of bytes is utilized to encode each of the respective position of the GUI element and the respective size of the GUI element, and wherein the respective variable-length sequence of bytes includes an initial byte that specifies how many bytes are utilized to encode each of the respective position of the GUI element and the respective size of the GUI element and thereby indicates a total number of bytes included in the respective variable-length sequence of bytes;
    combining the respective variable-length sequences of bytes for the GUI elements in the identified set into a combined sequence of bytes that encodes the generic visualization of the presented GUI, wherein the initial byte of each respective variable-length sequence of bytes in the combined sequence of bytes, other than a last variable-length sequence of bytes in the combined sequence of bytes, enables a recipient to identify the initial byte of a next variable-length sequence of bytes in the combined sequence of bytes; and
    after combining the respective variable-length sequences of bytes for the GUI elements in the identified set into the combined sequence of bytes that encodes the generic visualization of the presented GUI, transmitting the combined sequence of bytes that encodes the generic visualization of the presented GUI to a back-end platform associated with a provider of the client application.

2. The method of claim 1, wherein identifying the set of GUI elements within the presented GUI that is to be represented in the generic visualization of the presented GUI comprises:
identifying the set of GUI elements within the presented GUI that is to be represented in the generic visualization of the presented GUI at a given time during the runtime session of the client application when a change to GUI elements within the presented GUI has been detected by the client application.

3. The method of claim 1, wherein identifying the set of GUI elements within the presented GUI that is to be represented in the generic visualization of the presented GUI comprises:
identifying the set of GUI elements within the presented GUI that is to be represented in the generic visualization of the presented GUI based on an inspection of a view hierarchy defining GUI elements within the presented GUI.

4. The method of claim 3, wherein identifying the set of GUI elements within the presented GUI that is to be represented in the generic visualization of the presented GUI based on the inspection of the view hierarchy defining the GUI elements within the presented GUI comprises:
inspecting a given level of the view hierarchy;
based on inspecting the given level of the view hierarchy, identifying at least a first view to add to a set of candidate views that defines a set of candidate GUI elements for the generic visualization of the presented GUI, wherein the first view defines a first GUI element within the presented GUI;
evaluating whether the first GUI element defined by the first view fully obscures any GUI element defined by another view in the set of candidate views; and
based on the evaluating, removing at least a second view from the set of candidate views.

5. The method of claim 1, wherein, within the respective variable-length sequence of bytes for each GUI element in the identified set:
the respective position of the GUI element comprises a horizontal coordinate of the GUI element within the presented GUI and a vertical coordinate of the GUI element within the presented GUI; and
the respective size of the GUI element comprises a width of the GUI element and a height of the GUI element.

6. The method of claim 5, wherein, within the respective variable-length sequence of bytes for each GUI element in the identified set:
the initial byte specifying how many bytes are utilized to encode each of the respective position of the GUI element and the respective size of the GUI element comprises the initial byte specifying how many bytes of the respective variable-length sequence of bytes are respectively utilized to encode each of (i) the horizontal coordinate of the GUI element within the presented GUI, (ii) the vertical coordinate of the GUI element within the presented GUI, (iii) the width of the GUI element, and (iv) the height of the GUI element.

7. The method of claim 1, wherein, within the respective variable-length sequence of bytes for each GUI element in the identified set:
the initial byte also encodes the respective type of the GUI element.

8. The method of claim 1, wherein combining the respective variable-length sequences of bytes for the GUI elements in the identified set into the combined sequence of bytes that encodes the generic visualization of the presented GUI further comprises:
combining the respective variable-length sequences of bytes for the GUI elements in the identified set into a concatenated sequence of bytes having an order that corresponds to a rendering order of the GUI elements in the identified set.

9. A non-transitory computer-readable medium comprising program instructions stored thereon that are executable to cause a client device to perform functions comprising:
during a runtime session of a client application having a graphical user interface (GUI), presenting the GUI of the client application to an end user of the client device;
while presenting the GUI of the client application to the end user of the client device during the runtime session, identifying a set of GUI elements within the presented GUI of the client application that is to be represented in a generic visualization of the presented GUI;
for each GUI element in the identified set:
determining a respective type of the GUI element, a respective position of the GUI element, and a respective size of the GUI element; and
generating a respective variable-length sequence of bytes that encodes information for use in rendering a respective generic representation of the GUI element in place of a presented representation of the GUI element, wherein the encoded information includes the respective type, the respective position, and the respective size of the GUI element, wherein a variable number of bytes is utilized to encode each of the respective position of the GUI element and the respective size of the GUI element, and wherein the respective variable-length sequence of bytes includes an initial byte that specifies how many bytes are utilized to encode each of the respective position of the GUI element and the respective size of the GUI element and thereby indicates a total number of bytes included in the respective variable-length sequence of bytes;
combining the respective variable-length sequences of bytes for the GUI elements in the identified set into a combined sequence of bytes that encodes the generic visualization of the presented GUI, wherein the initial byte of each respective variable-length sequence of bytes in the combined sequence of bytes, other than a last variable-length sequence of bytes in the combined sequence of bytes, enables a recipient to identify the initial byte of a next variable-length sequence of bytes in the combined sequence of bytes; and
after combining the respective variable-length sequences of bytes for the GUI elements in the identified set into the combined sequence of bytes that encodes the generic visualization of the presented GUI, transmitting the combined sequence of bytes that encodes the generic visualization of the presented GUI to a back-end platform associated with a provider of the client application.

10. The non-transitory computer-readable medium of claim 9, wherein identifying the set of GUI elements within the presented GUI that is to be represented in the generic visualization of the presented GUI comprises:

identifying the set of GUI elements within the presented GUI that is to be represented in the generic visualization of the presented GUI at a given time during the runtime session of the client application when a change to GUI elements within the presented GUI has been detected by the client application.

11. The non-transitory computer-readable medium of claim 9, wherein identifying the set of GUI elements within the presented GUI that is to be represented in the generic visualization of the presented GUI comprises:
identifying the set of GUI elements within the presented GUI that is to be represented in the generic visualization of the presented GUI based on an inspection of a view hierarchy defining GUI elements within the presented GUI.

12. The non-transitory computer-readable medium of claim 11, wherein identifying the set of GUI elements within the presented GUI that is to be represented in the generic visualization of the presented GUI based on the inspection of the view hierarchy defining the GUI elements within the presented GUI comprises:
inspecting a given level of the view hierarchy;
based on inspecting the given level of the view hierarchy, identifying at least a first view to add to a set of candidate views that defines a set of candidate GUI elements for the generic visualization of the presented GUI, wherein the first view defines a first GUI element within the presented GUI;
evaluating whether the first GUI element defined by the first view fully obscures any GUI element defined by another view in the set of candidate views; and
based on the evaluating, removing at least a second view from the set of candidate views.

13. The non-transitory computer-readable medium of claim 9, wherein, within the respective variable-length sequence of bytes for each GUI element in the identified set:
the respective position of the GUI element comprises a horizontal coordinate of the GUI element within the presented GUI and a vertical coordinate of the GUI element within the presented GUI; and
the respective size of the GUI element comprises a width of the GUI element and a height of the GUI element.

14. A client device comprising:
at least one processor;
at least one non-transitory computer-readable medium; and
program instructions stored on the at least one non-transitory computer-readable medium that are executable by the at least one processor such that the client device is configured to:
during a runtime session of a client application having a graphical user interface (GUI), present the GUI of the client application to an end user of the client device;
while presenting the GUI of the client application to the end user of the client device during the runtime session, identify a set of GUI elements within the presented GUI of the client application that is to be represented in a generic visualization of the presented GUI;
for each GUI element in the identified set:
determine a respective type of the GUI element, a respective position of the GUI element, and a respective size of the GUI element; and
generate a respective variable-length sequence of bytes that encodes information for use in rendering a respective generic representation of the GUI element in place of a presented representation of the GUI element, wherein the encoded information includes the respective type, the respective position, and the respective size of the GUI element, wherein a variable number of bytes is utilized to encode each of the respective position of the GUI element and the respective size of the GUI element, and wherein the respective variable-length sequence of bytes includes an initial byte that specifies how many bytes are utilized to encode each of the respective position of the GUI element and the respective size of the GUI element and thereby indicates a total number of bytes included in the respective variable-length sequence of bytes;
combine the respective variable-length sequences of bytes for the GUI elements in the identified set into a combined sequence of bytes that encodes the generic visualization of the presented GUI, wherein the initial byte of each respective variable-length sequence of bytes in the combined sequence of bytes, other than a last variable-length sequence of bytes in the combined sequence of bytes, enables a recipient to identify the initial byte of a next variable-length sequence of bytes in the combined sequence of bytes; and
after combining the respective variable-length sequences of bytes for the GUI elements in the identified set into the combined sequence of bytes that encodes the generic visualization of the presented GUI, transmit the combined sequence of bytes that encodes the generic visualization of the presented GUI to a back-end platform associated with a provider of the client application.

15. The client device of claim 14, wherein the program instructions that are executable by the at least one processor such that the client device is configured to identify the set of GUI elements within the presented GUI that is to be represented in the generic visualization of the presented GUI comprise program instructions that are executable by the at least one processor such that the client device is configured to:
identify the set of GUI elements within the presented GUI that is to be represented in the generic visualization of the presented GUI at a given time during the runtime session of the client application when a change to GUI elements within the presented GUI has been detected by the client application.

16. The client device of claim 14, wherein the program instructions that are executable by the at least one processor such that the client device is configured to identify the set of GUI elements within the presented GUI that is to be represented in the generic visualization of the presented GUI comprise program instructions that are executable by the at least one processor such that the client device is configured to identify the set of GUI elements within the presented GUI that is to be represented in the generic visualization of the presented GUI based on an inspection of a view hierarchy defining GUI elements within the presented GUI.

17. The client device of claim 16, wherein the program instructions that are executable by the at least one processor such that the client device is configured to identify the set of GUI elements within the presented GUI that is to be represented in the generic visualization of the presented GUI based on the inspection of the view hierarchy defining the GUI elements within the presented GUI comprise program instructions that are executable by the at least one processor such that the client device is configured to:
    inspect a given level of the view hierarchy;
    based on inspecting the given level of the view hierarchy, identify at least a first view to add to a set of candidate views that defines a set of candidate GUI elements for the generic visualization of the presented GUI, wherein the first view defines a first GUI element within the presented GUI;
    evaluate whether the first GUI element defined by the first view fully obscures any GUI element defined by another view in the set of candidate views; and
    based on the evaluating, remove at least a second view from the set of candidate views.

18. The client device of claim 14, wherein, within the respective variable-length sequence of bytes for each GUI element in the identified set:
    the respective position of the GUI element comprises a horizontal coordinate of the GUI element within the presented GUI and a vertical coordinate of the GUI element within the presented GUI; and
    the respective size of the GUI element comprises a width of the GUI element and a height of the GUI element.

19. The client device of claim 15, wherein, within the respective variable-length sequence of bytes for each GUI element in the identified set:
    the initial byte specifying how many bytes are utilized to encode each of the respective position of the GUI element and the respective size of the GUI element comprises the initial byte specifying how many bytes of the respective variable-length sequence of bytes are respectively utilized to encode each of (i) the horizontal coordinate of the GUI element within the presented GUI, (ii) the vertical coordinate of the GUI element within the presented GUI, (iii) the width of the GUI element, and (iv) the height of the GUI element.

20. The client device of claim 14, wherein, within the respective variable-length sequence of bytes for each GUI element in the identified set:
    the initial byte also encodes the respective type of the GUI element.

\* \* \* \* \*